US011914163B2

United States Patent
Shramkova et al.

(10) Patent No.: US 11,914,163 B2
(45) Date of Patent: Feb. 27, 2024

(54) DEVICE FOR DEVIATING AND FOCUSING LIGHT

(71) Applicant: INTERDIGITAL MADISON PATENT HOLDINGS, SAS, Paris (FR)

(72) Inventors: Oksana Shramkova, Liffré (FR); Artem Boriskin, Thorigne-Fouillard (FR); Laurent Blonde, Thorigne-Fouillard (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 88 days.

(21) Appl. No.: 16/650,812

(22) PCT Filed: Aug. 27, 2018

(86) PCT No.: PCT/EP2018/072956
§ 371 (c)(1),
(2) Date: Mar. 25, 2020

(87) PCT Pub. No.: WO2019/063221
PCT Pub. Date: Apr. 4, 2019

(65) Prior Publication Data
US 2020/0233223 A1 Jul. 23, 2020

(30) Foreign Application Priority Data

Sep. 26, 2017 (EP) .................................... 17306276

(51) Int. Cl.
*G02B 27/09* (2006.01)
(52) U.S. Cl.
CPC ...... *G02B 27/095* (2013.01); *G02B 2207/101* (2013.01)

(58) Field of Classification Search
CPC ...... G02B 27/00; G02B 27/095; G02B 27/56; G02B 2207/101; G02B 3/00; G02B 3/005;
(Continued)

(56) References Cited

U.S. PATENT DOCUMENTS

| 4,079,411 A | 3/1978 | Engelbrecht |
| 5,229,797 A | 7/1993 | Futhey |

(Continued)

FOREIGN PATENT DOCUMENTS

| CN | 101573665 A | 11/2009 |
| CN | 101842691 A | 9/2010 |

(Continued)

OTHER PUBLICATIONS

Kotlyar et al "Photonic nanojets generated using square-profile microsteps"; Applied Optics / vol. 53, No. 24 / Aug. 20, 2014; p. 5322. (Year: 2014).*

(Continued)

*Primary Examiner* — Jie Lei
(74) *Attorney, Agent, or Firm* — Klintworth & Rozenblat IP LLP

(57) ABSTRACT

A device includes a host medium having a first refractive index value; a first layer comprising a first dielectric material having a second refractive index value, wherein the second refractive index value is greater than the first refractive index value, and wherein the first layer comprises a first step structure at a boundary between the first layer and the host medium; and a second layer comprising a second dielectric material and comprising a second step structure, the second layer having a third refractive index value higher than the first refractive index value of the host medium, wherein the second step structure is stacked on the first step structure, and, in response to an incident electromagnetic wave reach- (Continued)

ing the device, a first nanojet beam generated by the first step structure and a second nanojet beam generated by the second step structure are combined and focused around a first focusing point.

19 Claims, 20 Drawing Sheets

(58) Field of Classification Search
CPC ...... G02B 3/0056; G02B 3/0087; G02B 3/02; G02B 5/045; G02F 1/1335; G02F 1/133526; G02F 1/133524; G02F 1/1336; G02F 1/133603; G02F 1/133604
USPC .............. 359/642, 619, 521, 622, 454, 455
See application file for complete search history.

(56) References Cited

U.S. PATENT DOCUMENTS

| | | | |
|---|---|---|---|
| 6,452,675 | B1 | 9/2002 | Mueller |
| 7,394,535 | B1 | 7/2008 | Chen |
| 8,003,965 | B2 | 8/2011 | Grbic |
| 8,554,031 | B2 | 10/2013 | Astratov |
| 8,953,064 | B1 | 2/2015 | Ng |
| 9,673,242 | B2 * | 6/2017 | Han .................. H01L 27/14621 |
| 2002/0135883 | A1 * | 9/2002 | Nishikawa ........... G02B 3/0018 359/619 |
| 2005/0281524 | A1 | 12/2005 | Mouli |
| 2010/0271634 | A1 | 10/2010 | Dominguez Horna |
| 2011/0134519 | A1 | 6/2011 | Cooper |
| 2012/0091369 | A1 | 4/2012 | Astratov |
| 2014/0111677 | A1 | 4/2014 | Fukuda |
| 2014/0221533 | A1 | 8/2014 | Hata |
| 2014/0327966 | A1 | 11/2014 | Tani |
| 2015/0090862 | A1 | 4/2015 | Matsui |
| 2015/0248790 | A1 | 9/2015 | Schowengerdt |
| 2015/0270303 | A1 | 9/2015 | Han |
| 2016/0056195 | A1 * | 2/2016 | Lee .................. H01L 27/14621 257/432 |
| 2016/0077261 | A1 | 3/2016 | Arbabi |
| 2017/0176679 | A1 | 6/2017 | Oka |
| 2017/0207421 | A1 | 7/2017 | Matsuzaki |
| 2017/0250577 | A1 | 8/2017 | Ho |

FOREIGN PATENT DOCUMENTS

| | | |
|---|---|---|
| CN | 103842445 A | 6/2014 |
| WO | 2017162880 A1 | 9/2017 |
| WO | 2017162882 | 9/2017 |

OTHER PUBLICATIONS

Hua, Hong, et. al., "A 3D Integral Imaging Optical See-Through Head-Mounted Display". Optical Society of America, Optics Express, vol. 22, No. 11, Jun. 2, 2014, pp. 13484-13491 (8 pages).

Grbic, Anthony, et. al., "Near-Field Plates: Subdiffraction Focusing with Patterned Surfaces". Science, vol. 320, Issue. 5875, Apr. 25, 2008, 11 pages.

Novotny, Lukas, et. al., "Near-field Optical Microscopy and Spectroscopy with Pointed Probes". Annual Review of Physical Chemistry, vol. 57, (2006) pp. 303-331.

Tirosh, Udi, "New Flat Lenses Technology Could Offer Smaller Lenses With Zero Chromatic Aberration". DIY Photography, Feb. 20, 2015, 8 pages.

Pacheco-Peña, V., et al., "Multifrequency Focusing And Wide Angular Scanning Of Terajets". Optical Society of America, Optics Letters, vol. 40, No. 2, (2015), 5 pages.

Pacheco-Peña, V., et al., "Terajets Produced By Dielectric Cuboids". Applied Physics Letters 105, 084102, (2014), doi: 10.1063/1.4894243, 5 pages.

Gu, Yinghong, et al., "Color Generation Via Subwavelength Plasmonic Nanostructures". Nanoscale, vol. 7, (2015), pp. 6409-6419.

Nishiwaki, Seiji, "Efficient Colour Splitters For High-Pixel-Density Image Sensors". Nature Photonics, vol. 7, Mar. 2013, pp. 240-246.

Kress, Bernard, et. al., "A Review Of Head-Mounted Displays (HMD) Technologies And Applications For Consumer Electronics". Proceedings of SPIE, vol. 8720, (2013), pp. 87200A-1-13.

Kong, Soon-Cheol, et. al., "Photonic Nanojet-Enabled Optical Data Storage". Optical Society of America, Optics Express, vol. 16, No. 18, Sep. 1, 2008, pp. 13713-13719.

Heifeiz, Alexander, et. al., "Photonic Nanojets". Journal of Computational Theoretical Nanoscience, vol. 6, No. 9., (2009), pp. 1979-1992 (14 pages).

Mukawa, Hiroshi, et. al., "A Full-Color Eyewear Display Using Planar Waveguides with Reflection Volume Holograms". Journal of the Society for Information Display (SID), vol. 17, No. 3, (2009), pp. 185-193.

Guo, Si Yue, et. al., "Fabrication of Optical Fiber Probes for Scanning Near-Field Optical Microscopy". McGill Science Undergraduate Research Journal (MSURJ) vol. 3, No. 1, Mar. 2008, pp. 32-39.

Lee, J. Y. et al. "Near-field focusing and magnification through self-assembled nanoscale spherical lenses." Nature 460, No. 7254, Jul. 2009, pp. 498-501 (4 pages).

Pikulin, A. et al., "Effects of spherical mode coupling on near-field focusing by clusters of dielectric microspheres." Optics Express vol. 20, No. 8, Apr. 2012, pp. 9052-9057 (6 pages).

Park, Y., "Scattering superlens: near-field focusing and imaging exploiting multiple scattering in turbid media." In 2015 11th Conference on Lasers and Electro-Optics Pacific Rim (CLEO-PR), vol. 3,. IEEE, 2015 (2 pages).

Geints, Y. E., et al., "Near-field focusing of an optical wave by diffraction gratings." Quantum Electronics 46, No. 7, 2016 (6 pages).

Guo, H., et al., "Near-field focusing of the dielectric microsphere with wavelength scale radius." Optics Express 21, No. 2, 2013, pp. 2434-2443 (11 pages).

* cited by examiner

DEVICE FOR DEVIATING AND FOCUSING LIGHT

CROSS-REFERENCE TO RELATED APPLICATIONS

The present application is a national stage application under 35 U.S.C. 371 of International Application No. PCT/EP2018/072956, entitled "DEVICE FOR DEVIATING AND FOCUSING LIGHT", filed on Aug. 27, 2018, which claims benefit from European Patent Application Serial No. 17306276.1, entitled "DEVICE FOR DEVIATING AND FOCUSING LIGHT", filed Sep. 26, 2017, which is hereby incorporated by reference in its entirety.

TECHNICAL FIELD

The disclosure relates to a technique for guiding electromagnetic waves, and especially visible light waves.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Developing techniques for guiding visible light, which is an electromagnetic radiation, is an hectic research topic. Indeed, the use of light is widespread in our society, and can be applied in a wide range of applications. For example, in our day to day life, people are using more and more devices that can deliver information to our eyes. Indeed, from see-through glasses, to head mounted devices, and passing through smartphones comprising display structures (either LCD or LED display devices or OLED display devices) to TV set, devices that can generate information via light are an important brick in numerous electronic devices. In addition, in other devices such as optical fibers, or in image sensors, the guiding of light is mandatory in order to obtain efficient results that can fulfill some expectations. As explained in PCT patent applications PCT/EP2017/057129 and PCT/EP17/057131, which have not been published yet at the time of filing the present patent application, the guiding of visible light (in term of deviation or in term of focusing effect) can be achieved via the use of a single step like structure within a dielectric layer, where the choices of a value of a height of the step, and a value of a base angle (i.e. related to the slope of the step), have an impact on the deviation of an incident light (i.e. these parameters enable the control of a complex electromagnetic phenomenon associated with the light diffraction on edges of a step). The term of single step nanojets (NJ) lenses can be used for mentioning the optical architectures or systems described in PCT patent applications PCT/EP2017/057129 and PCT/EP17/057131.

However, obtaining a technique that can improve the focusing efficiency of a single step nanojets lens (i.e. that generate a field intensity enhancement in the focal spot), while preserving all other advantages of a single step nanojets lens (such as wavelength-scale dimensions, sub-wavelength resolution, and low dispersive behavior) is still an open question.

The present disclosure proposes a solution that can achieve such expectation.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Hence, in one embodiment of the disclosure, it is proposed to combine two single steps structures has depicted in PCT patent applications PCT/EP2017/057129 and PCT/EP17/057131, into a multi-steps structure for enhancing the intensity of the generated focused beam.

Hence, in one embodiment of the disclosure, it is proposed a nanojets lens that comprises a first step and a second step within material layers, wherein the second step is stacked upon the top of the first step, with a shift, and wherein the dimensions of a height of the second step and the width of the second step are defined according to an angle of incidence of an incident light on the nanojets lens and/or a base angle associated with each of the first and second steps and/or the width and the height of the first step, in order to focus nanojets beams generated from the first step and the second step on a point or area. Hence, compared to a nanojets lens as described in PCT patent applications PCT/EP2017/057129 and PCT/EP17/057131, the proposed technique enables to obtain more intense focused nanojet beams.

More precisely, the present disclosure is directed to a device for generating and guiding nanojets beams from an incident electromagnetic wave on said device. The device is remarkable in that it comprises:

a first layer of a dielectric material having a first refractive index value;

a second layer of a dielectric material having a second refractive index value, wherein said second refractive index value is greater than said first refractive index value; and wherein a first boundary between said first and second layers comprises a first single step shape structure, said first single step shape structure being a change of level that is defined sensibly according to a first straight line being associated with an angle of inclination close to a first angle of inclination, wherein said device further comprising a dielectric element comprised in an embedding layer, said embedding layer being either said first layer or said second layer, said dielectric element having a refractive index ($n_3$), higher than the one from said embedding layer, and wherein a second boundary between said dielectric element and said embedding layer comprises a second single step shape structure, said second single step shape structure being a change of level that is defined sensibly by a second straight line being associated with an angle of inclination close to a second angle of inclination, and wherein said second single step shape structure is positioned at the vicinity of said first single step shape structure for focusing nanojets beams generated by each of said first and second single step shape structures around a first focusing point.

In a preferred embodiment, said first boundary further comprises a third single step shape structure, said third single step shape structure being a change of level that is defined sensibly by a third straight line being associated with an angle of inclination closed to said first angle of inclination in absolute value, wherein said first single step shape structure and said third single step shape structure face each other, and are distant from each other with a first distance, and wherein said second boundary further comprises a fourth single step shape structure, said fourth single step shape structure being a change of level that is defined sensibly by a fourth straight line being associated with an angle of inclination closed to said second angle of inclination in absolute value, and wherein said second single step shape structure and said fourth single step shape structure face each other, and are distant from each other with a second distance being smaller than said first distance, and wherein said fourth single step shape structure is positioned at the vicinity of said third single step shape structure for focusing nanojets beams generated by each of said third and fourth single step shape structures around a second focusing point.

In a preferred embodiment, the incident electromagnetic wave is a plane wave that is normal to the device, and wherein said first and second angle are equal to 90 degrees, and wherein said first and second focusing point are close to each other.

In a preferred embodiment, said first and third single step shape structures have a same first height $H_1$, and wherein said second and fourth single step shape structures have a same second height $H_2$, and wherein said second height $H_2$ has a value around $$\left(\frac{d_1}{2}\right) \cdot \gamma_1 - H_1,$$

wherein $d_1$ is said first distance, and $\gamma_1$ is around $$\frac{1}{\tan|\Theta_{B1}|},$$

with $\Theta_{B1}$ being a nanojets beam radiation angle generated by said first and third single step shape structure, wherein $$\Theta_{B1} \approx \frac{90° - \Theta_{TIR1}}{2}$$

with $$\Theta_{TIR1} = \sin^{-1}\left(\frac{n_1}{n_2}\right)$$

being a first critical angle of refraction, $n_1$ being said first refractive index value, $n_2$ being said refractive index of said second layer, and wherein $$\left(\frac{d_2}{2}\right)$$

has a value around $H_2/\gamma_2$, wherein $d_2$ is said second distance, $\gamma_2$ is around $$\frac{1}{\tan|\Theta_{B2}|},$$

with $\Theta_{B2}$ being a nanojets beam radiation angle generated by said second and fourth single step shape structure, wherein $$\Theta_{B2} \approx \frac{90° - \Theta_{TIR2}}{2}$$

with $$\Theta_{TIR2} = \sin^{-1}\left(\frac{n_1}{n_3}\right)$$

being a first critical angle of refraction, $n_3$ being the refractive index of said dielectric element.

In a preferred embodiment, the incident electromagnetic wave is a plane wave that is normal to said first and second layers, and wherein said first and second angle are equal to an angle $\alpha$, and wherein said first and second focusing point are close to each other.

In a preferred embodiment, said first and third single step shape structures have a same first height $H_1$, and wherein said second and fourth single step shape structures have a same second height $H_2$, and wherein said second height $H_2$ has a value around $$\left(\frac{d_1}{2}\right) \cdot \gamma_1 - H_1,$$

wherein $d_1$ is said first distance, and $\gamma_1$ is around $$\frac{1}{\tan|\Theta_{B1}|},$$

with $\Theta_{B1}$ being a nanojets beam radiation angle generated by said first, and third single step shape structure, wherein $$\Theta_{B1} \approx 90° - \frac{\Theta_{TIR1} + \alpha}{2}$$

with $$\Theta_{TIR1} = \sin^{-1}\left(\frac{n_1}{n_2}\right)$$

being a first critical angle of refraction, $n_1$ being said first refractive index value, $n_2$ being said refractive index of said second layer, and wherein $$\left(\frac{d_2}{2}\right)$$

has a value around $H_2/\gamma_2$, wherein $d_2$ is said second distance, $\gamma_2$ is around $$\frac{1}{\tan|\Theta_{B2}|},$$

with $\Theta_{B2}$ being a nanojets beam radiation angle generated by said second and fourth single step shape structure, wherein $$\Theta_{B2} \approx 90° - \frac{\Theta_{TIR2} + \alpha}{2}$$

with $$\Theta_{TIR2} = \sin^{-1}\left(\frac{n_1}{n_3}\right)$$

being a first critical angle of refraction, $n_3$ being the refractive index of said dielectric element.

In a preferred embodiment, the incident electromagnetic wave is a plane wave that hits said device with an angle of incidence $\Theta_i$, and wherein said first and second angle are equal to 90 degrees, and wherein said first and second focusing point are close to each other.

In a preferred embodiment, said refractive index of said second layer is equal to said refractive index of said dielectric element, and wherein said first and third single step shape structures have a same first height $H_1$, and wherein said second distance $d_2$ is defined according to following equation $$\left(\frac{d_2}{2}\right) = \left(\frac{d_1}{2}\right) - H_1 \cdot \frac{\tan\Theta'_{B1} + \tan\Theta''_{B1}}{2},$$

wherein $$\Theta'_{B1} \approx \frac{90° - \Theta_{TIR}}{2} + \frac{\Theta_i}{2}, \text{ and } \Theta''_{B1} \approx \frac{90° - \Theta_{TIR}}{2} - \frac{\Theta_i}{2},$$

with $d_1$ being said first distance, and $$\Theta_{TIR} = \sin^{-1}\left(\frac{n_1}{n_2}\right)$$

being a critical angle of refraction, $n_1$ being said first refractive index value, $n_2$ being said refractive index of said second layer.

In a preferred embodiment, said refractive index of said dielectric element is smaller than the refractive index of the layer, among said first and second layers that is not said embedding layer.

In a preferred embodiment, said incident electromagnetic wave has a wavelength which is equal to a value comprised between 390 to 700 nm.

In a preferred embodiment, said dielectric element has a shape that belongs to a group of shapes comprising:
cuboid shape;
cylinder shape;
prism shape.

BRIEF DESCRIPTION OF THE DRAWINGS

The above and other aspects of the invention will become more apparent by the following detailed description of exemplary embodiments thereof with reference to the attached drawings in which.

DETAILED DESCRIPTION

The present disclosure relates to techniques for focusing electromagnetic waves (and among them visible light) and, more particularly, techniques for near-field focusing and beam forming. The present disclosure provides a specific technique for generating condensed optical nanojets beams with the aid of purely dielectric microstructures. Indeed, such technique relies on the complex electromagnetic phenomenon associated with the light diffraction on edges of a step like dielectric microstructures embedded in a host medium with refractive index lower than that of the microstructure, as already identified and explained in document in PCT patent applications PCT/EP2017/057129 and PCT/EP17/057131.

Figure 1:
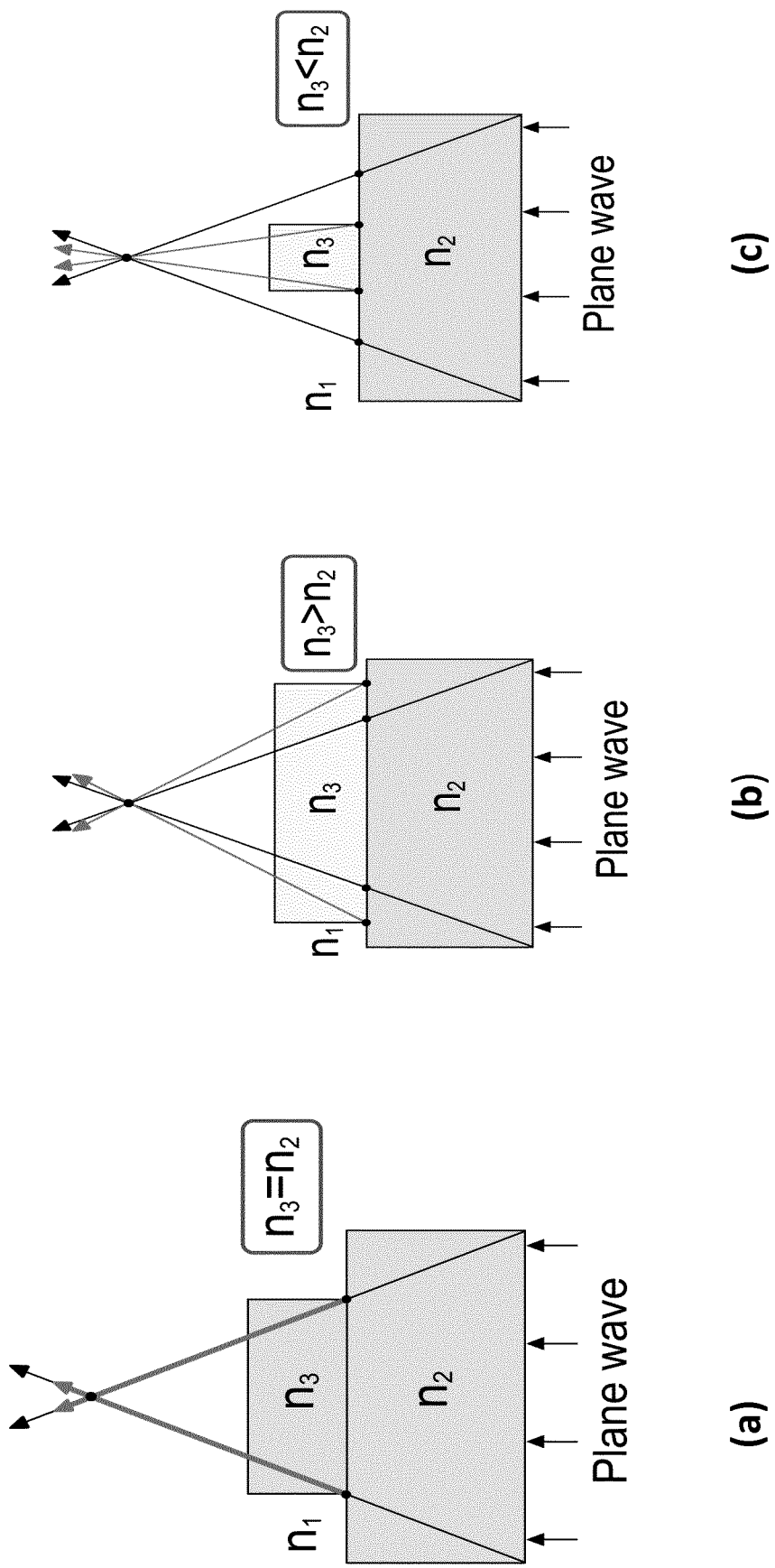
FIGS. 1(*a*), 1(*b*) and 1(*c*) present schematic views of three possible variant of double-steps nanojets lens according to different embodiment of the disclosure for which the following relationships between refractive indexes of dielectric layers/elements occur: $n_2 = n_3$ (FIG. 1(*a*)), or $n_3 > n_2$ (FIG. 1(*b*)) or $n_3 < n_2$ (FIG. 1(*c*))

As depicted in FIGS. 1(a)-(c), the disclosure is related to a modification of the topology of the nanojets lenses detailed in PCT patent applications PCT/EP2017/057129 and PCT/EP17/057131 to a more complex shape having at least two steps in a vertical cross-section.

Hereafter, nanojets lenses having such a topology are referred as a layered step-like nanojets lenses, in contrast to the single-layer or single-step nanojets lenses presented in PCT patent applications PCT/EP2017/057129 and PCT/EP17/057131. This transformation results in the increase of the field intensity in the focal spot compared to the single step nanojets lenses. As explained in the following, depending on the lens dimensions and materials used for each layer, the increase of the field intensity can be about 10% to 25%. It should be noted that such increase of the field intensity was observed for the lenses with dimensions of about one wavelength. A larger enhancement can be obtained through a multi-parameter optimization of the step-like lens topology and materials for the lenses with bigger dimensions.

More precisely, in one embodiment of the disclosure, it is proposed to transform the shape of a nanojets lens in a such a way that all the nanojets beams, originating from different edges (associated with different layers) of the step-like microstructure, recombine and contribute to the formation of a single high-intensity nanojets beam that can be located on the axis of symmetry of the system (as depicted in FIGS. 1(a)-(c)), when the angle of incidence is equal to 90°. As schematically shown in FIGS. 1(a)-(c), the desired effect can be achieved using a multi-layer steps structures of the focusing element and combining two or more materials with different refractive indexes. It should be noted that, in another embodiment of the disclosure, only a half of the structures depicted in FIGS. 1(a)-(c) can be used (i.e. in that case, there is no symmetry in the structure).

It should also be noted that an additional advantage of the proposed double-steps nanojets lens is the increase of the nanojets beam length as the result of the partial contributions of multiple nanojets beams, associated with different layers. The characteristics of these nanojets beams are controlled by the parameters of the corresponding layers (i.e. refractive index ratios between the lens and host medium, base angle and size/shape of the step).

Figure 12:
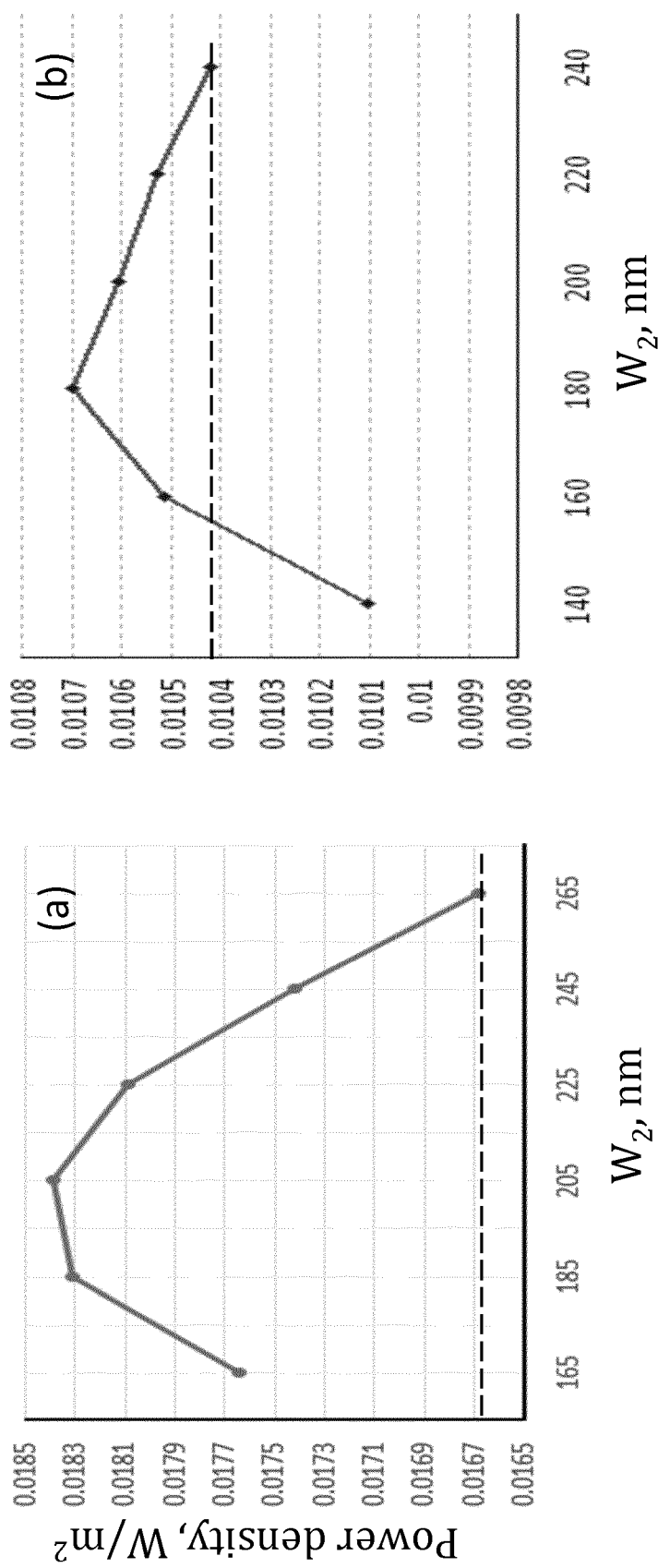
FIG. 12 presents the peak power density versus $W_2$ for a system with parameters: $n_1=1$, $n_2=n_3=1.5$, $W_1=275$ nm, $H_1=200$ nm; (a)—$H_2=200$ nm, $\alpha=87.2°$; (b) —$H_2=100$ nm, $\alpha=80.1°$. System is illuminated by a plane wave with $\lambda=550$ nm and $Y_0=0$.
Figure 14:
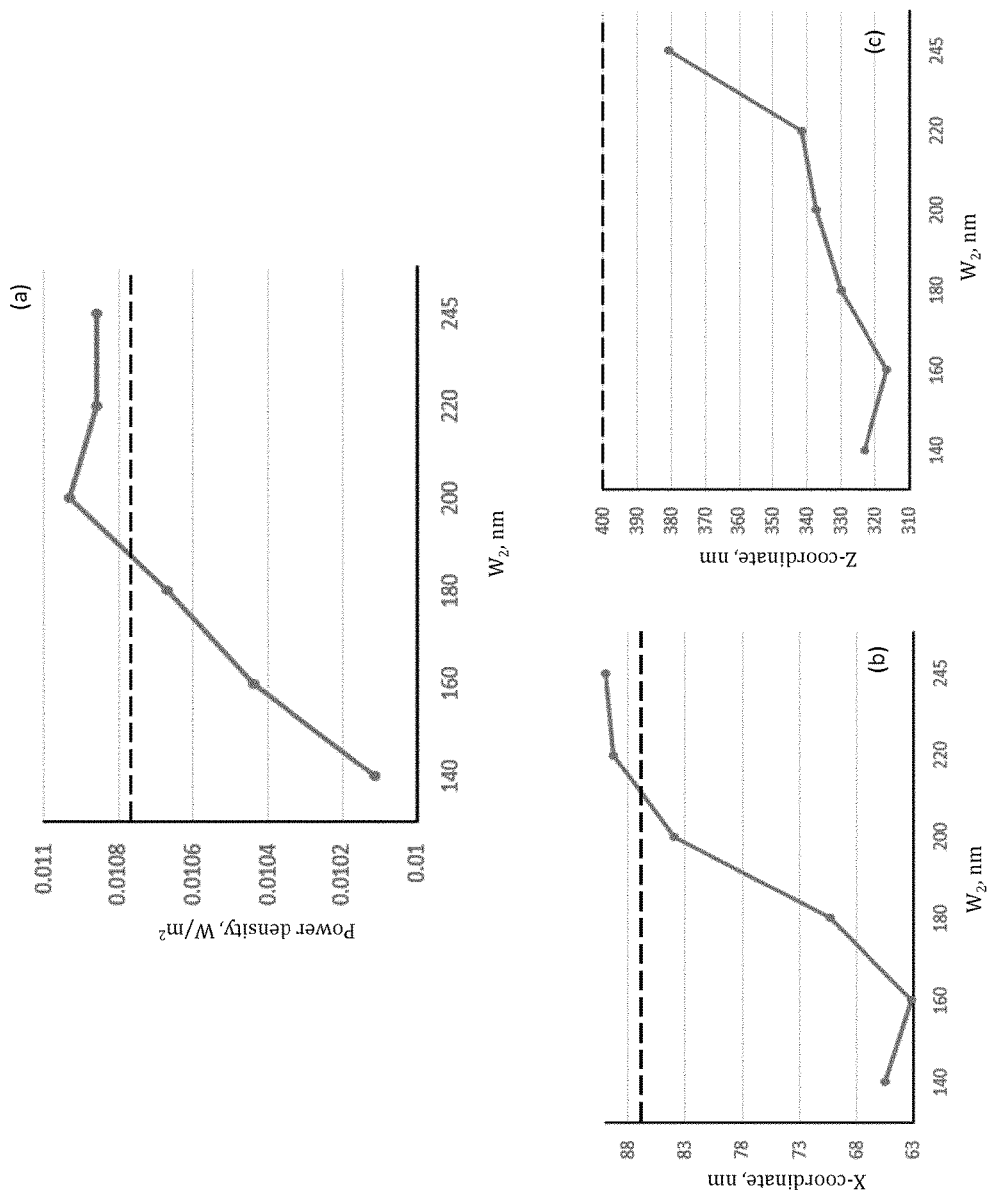
FIG. 14 presents (a)—Peak power density versus $W_2$; (b,c)—Position of nanojets' hot spots versus the width $W_2$ for a step-like nanojets lens illuminated by a plane wave at $\lambda=550$ nm, $Y_0=0$ and $\Theta_i=15°$ for the systems with such parameters: $n_1=1$, $n_2=n_3=1.5$, $W_1=275$ nm, $H_1=200$ nm, $H_2=100$ nm.
Figure 15:
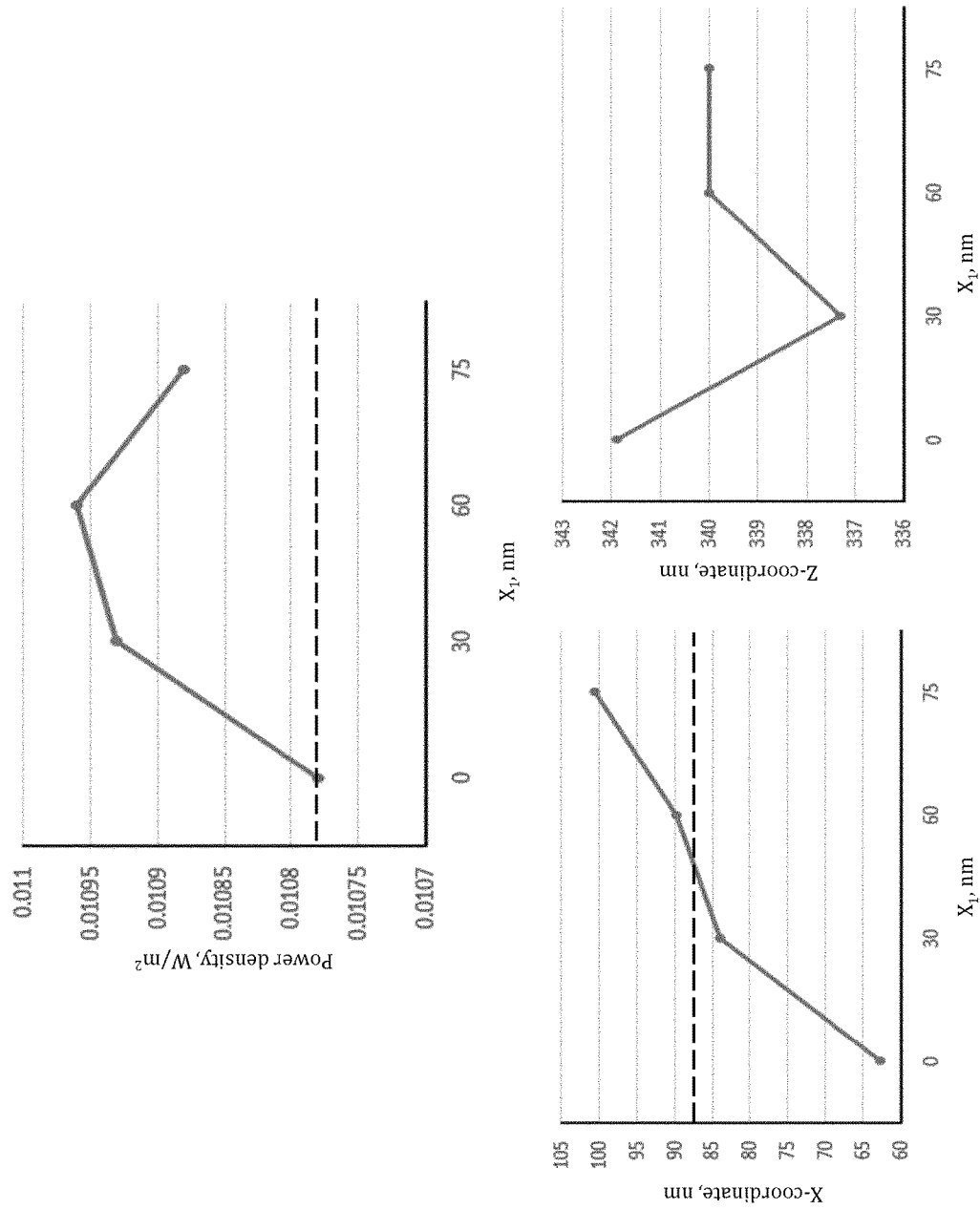
FIG. 15 describes (a) peak power density; (b,c) Position of nanojets' hot spots versus $X_1$ for a double steps nanojets lens illuminated by a plane wave at $\lambda=550$ nm, $Y_0=0$ and $\Theta_i=15°$ for the systems with such parameters: $n_1=1$, $n_2=n_3=1.5$, $W_1=275$ nm, $H_1=200$ nm, $H_1=100$ nm. Z-coordinate of the reference solution (single step nanojets lens of the same total height) corresponds to 400.2 nm.

The proposed disclosure has been validated numerically via full-wave electromagnetic analysis of a double-steps nanojets lens in a form of an infinite rib (FIGS. 4-7,10), or a prism (FIG. 12) or a cylinder (FIGS. 14 and 15). For simplicity, we assume that all the materials are lossless and non-dispersive. The analysis has revealed that diffraction of a plane wave on a double-steps nanojets lens, with the materials of the steps (layers) having a higher refractive index than that of the host medium, can result in the formation of more intensive condensed optical beams (so-called nanojets). The intensity, dimensions and shape of each individual beam can be controlled by the variation of the step size, shape (e.g. base angle), material and position of the second step (i.e. the oblique incidence for which we should take nonsymmetrical system).

Figure 2:
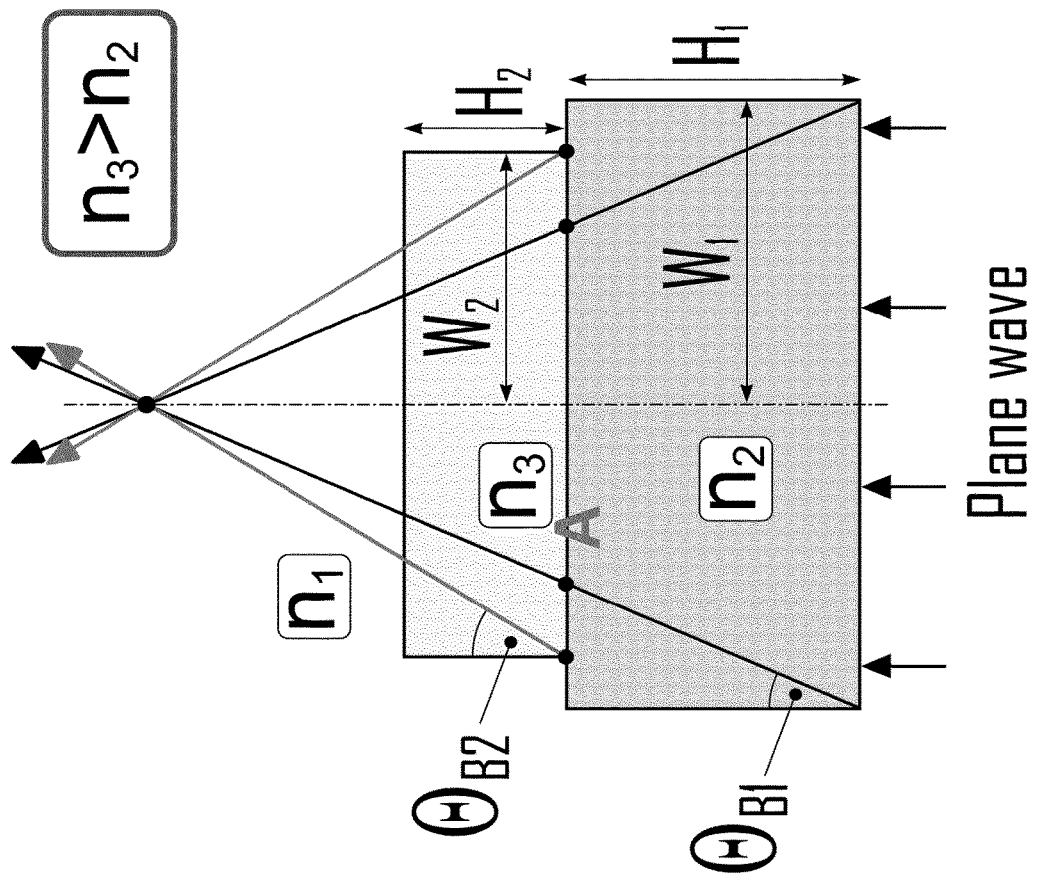
FIG. 2 presents a cross-section of a double-steps nanojets lens according to one embodiment of the disclosure.

The general topology of the double-steps-like nanojets lens is illustrated in FIG. 2. This cross-section view may correspond to a double-layer rib, cuboid, or cylinder with an arbitrary cross-section embedded in a homogeneous dielectric host media with a refractive index $n_1<n_2$. Hereafter, we assume that the material and size of the second layer with refractive index $n_3$ can be selected arbitrary and optimized depending on the parameters of first layer in order to reach a maximum field intensity enhancement for the beam generated in the near zone as a result of recombination of the nanojets beams associated with the edges of the step-like nanojets lens. The effect of the size and refractive index of the second layer on the intensity and length of the generated nanojets is described in the following.

Hereafter, we consider the structures with vertical edges parallel to z-axis and top/bottom surface parallel to xy-plane, which corresponds to a base angle $\alpha=90$ degrees. However, some prismatic structures (with arbitrary base angles) can also be used. Variation of the base angle value provides additional degree of freedom in the control of the nanojets beam radiation direction. Such variant is described later in this document.

In a first approximation, the focal length of the step-like nanojets lens can be characterized as the function of the size (width or radius) and index ratio of the media inside and outside the microstructure. In the following, we present a set of equations to estimate the optimal dimensions of the layers for maximal enhancement of the field intensity of generated nanojets.

It should be noted that the beam shape and hot spot position are sensitive to the sizes/form of the complex step-like lens. This effect is explained by the interference of the nanojets beams, associated with the bottom edge of the first step (first layer) of the system, and the nanojets beam, associated with the bottom edge of the second step (second layer). In this case, the two beams make an input into the total generated beam.

The total response of the elements with dimensions larger than a few wavelengths in the medium the lens represents the interplay between the nanojets and Fresnel diffraction phenomenon.

As it was demonstrated in PCT patent applications PCT/EP2017/057129 and PCT/EP17/057131, the beam-forming phenomenon is associated solely with the edge of the system and the nanojets beam radiation angle is defined by the Snell's low.

So, it can be determined as a function of the ratio between the refraction indexes of the host media and material of the steps, and the base angle of the element. The FIG. 2 presents a structure with vertical edges (i.e. with base angles being equal to 90°).

For a structure where $n_2=n_3$, the nanojets beam radiation angles $\Theta_{B1}$ and $\Theta_{B2}$ can be determined using the approximate formula:

$$\Theta_{B1} = \Theta_{B2} = \Theta_B \approx \frac{90° - \Theta_{TIR}}{2},$$

where $$\Theta_{TIR} = \sin^{-1}\left(\frac{n_1}{n_2}\right)$$

is the critical angle of refraction. Therefore, the focal length of the steps can be estimated via the following equation:

$$F_j = W_j \gamma$$

where j=1,2, $$\gamma = \frac{1}{\tan\Theta_B},$$

and $W_j$ is the half-width (radius) of a single element or step.

In order to increase the intensity in the nanojets hot spot, it is proposed to adjust the focal lengths of the constitutive elements as follows:

$$F_1 = H_1 + F_2$$

Here $H_j$ is the height of the corresponding step (see in FIG. 2). Assuming that the maximal intensity of the nanojets hot spot corresponds to the elements with the total height equal to the focal length, we can get the formulas for the sizes of the top layer:

$$H_2 \approx W_1 \gamma - H_1$$

$$w_2 \approx \frac{H_2}{\gamma}$$

It is necessary to note, that if materials of the steps are different, we should use this approximate formulas just for preliminary estimation of the second step size taking into account that for $n_3 > n_2 > n_1$, $\Theta_{B1} < \Theta_{B2}$, and for $n_3 < n_2$ ($n_2 > n_1$ and $n_3 > n_1$) $\Theta_{B1} > \Theta_{B2}$. It means that for a proper adjustment, the dimensions of the top step should be corrected: for $n_3 > n_2$ the total width (radius) of the top step should be increased, for $n_3 < n_2$ the total width (radius) of the top step should be less than the optimal one.

Note that the intensity of the generated nanojets beam is sensitive to the height of the bottom layer ($H_1$). The maxima of intensity occurs at optical path difference between the nanojets beam and wave propagating in the first step given by $$\Delta = 2k\frac{\lambda}{2},$$

where k is an integer number. For the proposed system, the optical path difference in the point A (see FIG. 2) is equal to $$\Delta = \frac{1 - \cos\Theta_{B1}}{\cos\Theta_{B1}} H_1.$$

Figure 3:
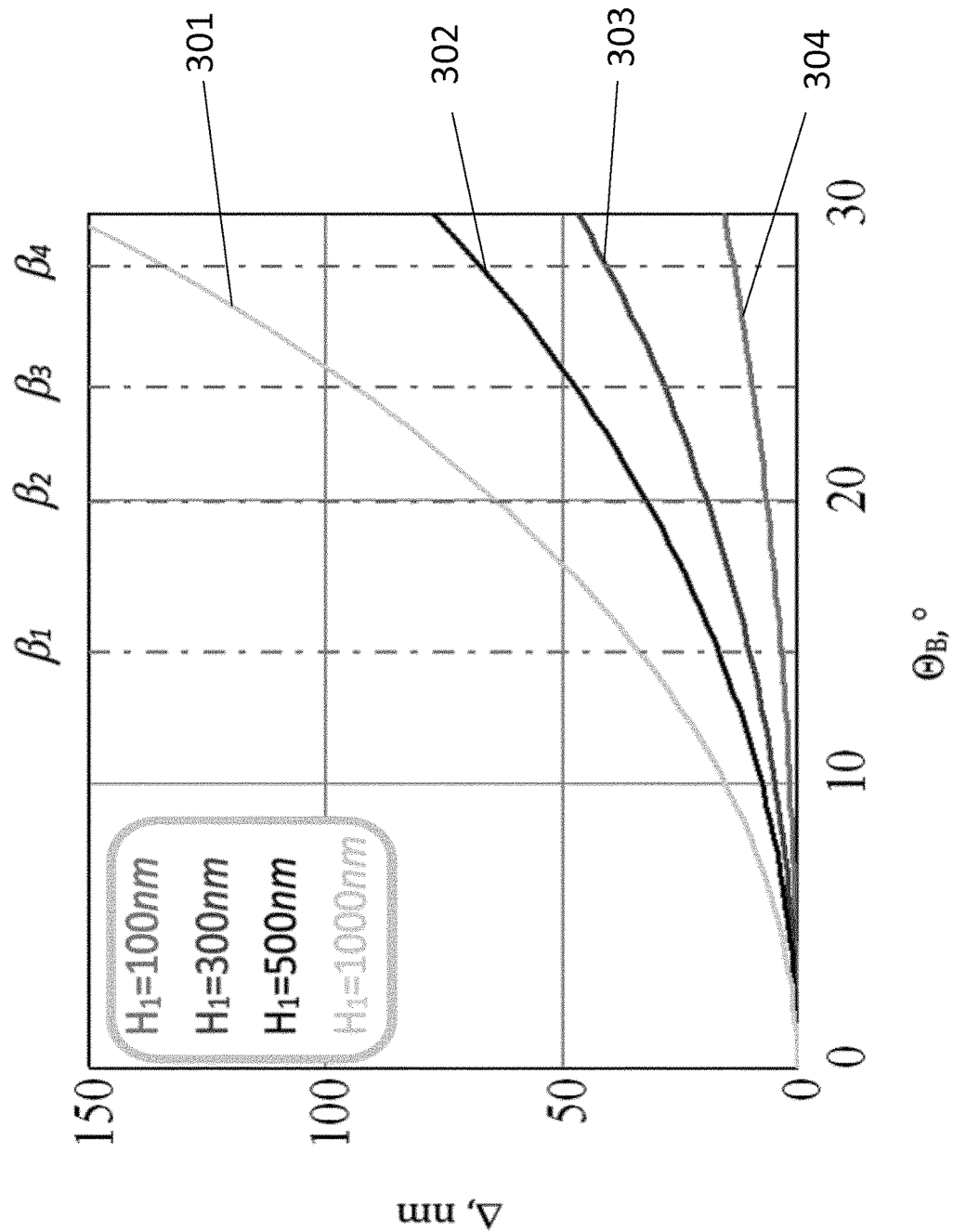
FIG. 3 presents the evolution of optical path according to the variation of nanojets beam radiation angles for a single layer nanojets lens with different heights.

The dependence of the optical path difference on the nanojets beam radiation angle for four different values $H_1$ is presented in FIG. 3 (the curve referenced 301 represents the relationship between the nanojets beam radiation angle and the distance of the focusing point, for a height $H_1$ equal to 1000 nm; the curve referenced 302 represents the relationship between the nanojets beam radiation angle and the distance of the focusing point, for a height $H_1$ equal to 500 nm; the curve referenced 303 represents the relationship between the nanojets beam radiation angle and the distance of the focusing point, for a height $H_1$ equal to 300 nm; the curve referenced 304 represents the relationship between the nanojets beam radiation angle and the distance of the focusing point, for a height $H_1$ equal to 100 nm). The vertical dash-dot lines indicate the nanojets beam radiation angles for some particular values of the ratios of refractive indexes $$\left(\beta = \frac{n_2}{n_1}\right).$$

In FIG. 3, we have $n_1=1$, and $\beta_1=1.15$, $\beta_2=1.3$, $\beta_3=1.49$ and $\beta_4=1.8$. It can be seen, that for the nanojets lenses with dimensions of about one wavelength, the equation $$\Delta = 2k\frac{\lambda}{2}$$

can not be fully satisfied. The analysis of $\Delta$ in FIG. 3 shows that for small values of $\beta$ the optical path difference is minimal ($\Delta \to 0$). This suggests that the maximal relative field intensity enhancement in the focal spot of a double-steps nanojets lens can be expected in a case of small difference between the refractive indexes of the lens and the host medium materials.

Let us present the data obtained using the electromagnetic field simulation software package CST MICROWAVE STUDIO. The lens is assumed to be infinite along y-axis (rib-type) and is illuminated by a linearly-polarized plane wave E={0,1,0}. The materials of the steps of the nanojets lens can be the same ($n_2=n_3$). To illustrate the influence of the nanojets lens topology on the parameters of the nanojets beams, we consider the system with the following parameters: $n_1=1$, $n_2=n_3=1.49$ (and $\gamma=2.25$), $W_1=275$ nm, $H_1=350$ nm (the dimensions of the bottom layer are arbitrary). The presented simulations were done for 2D problem.

By using the previously established equations $H_2 \approx W_1\gamma - H_1$ and $$w_2 \approx \frac{H_2}{\gamma},$$

the optimal dimensions of the second step can be obtained: $W_2=107.5$ nm and $H_2=268.8$ nm.

Figure 4A:
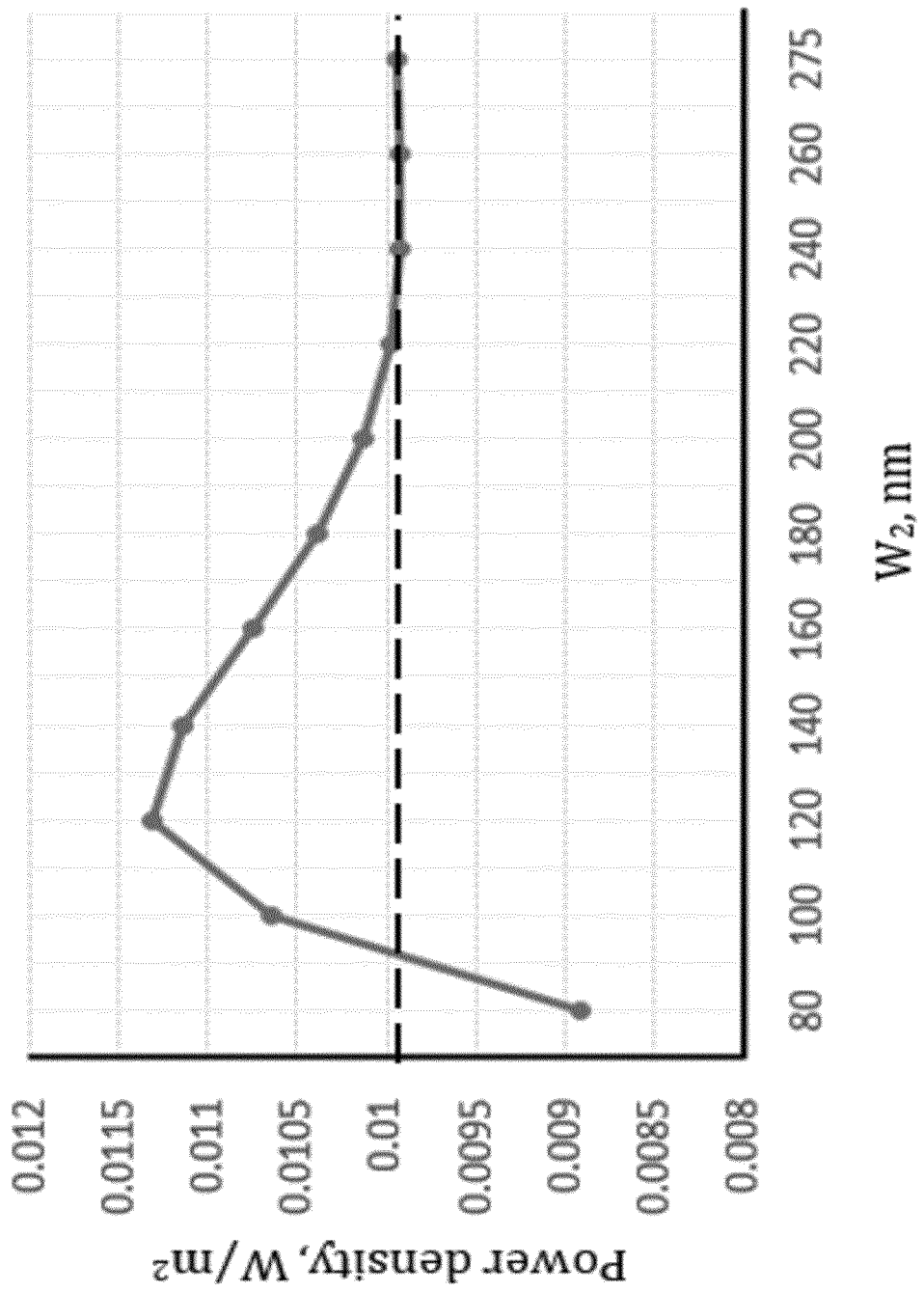
FIGS. 4(*a*) and 4(*b*) present respectively a peak power density and Z-coordinate of nanojets hot spot versus $W_2$ for a step-like systems with such parameters: $n_1=1$, $n_2=n_3=1.49$, $W_1=275$ nm, $H_1=350$ nm, $H_2=250$ nm, that is illuminated by a unit-amplitude plane wave at $\lambda=550$ nm.
Figure 4B:
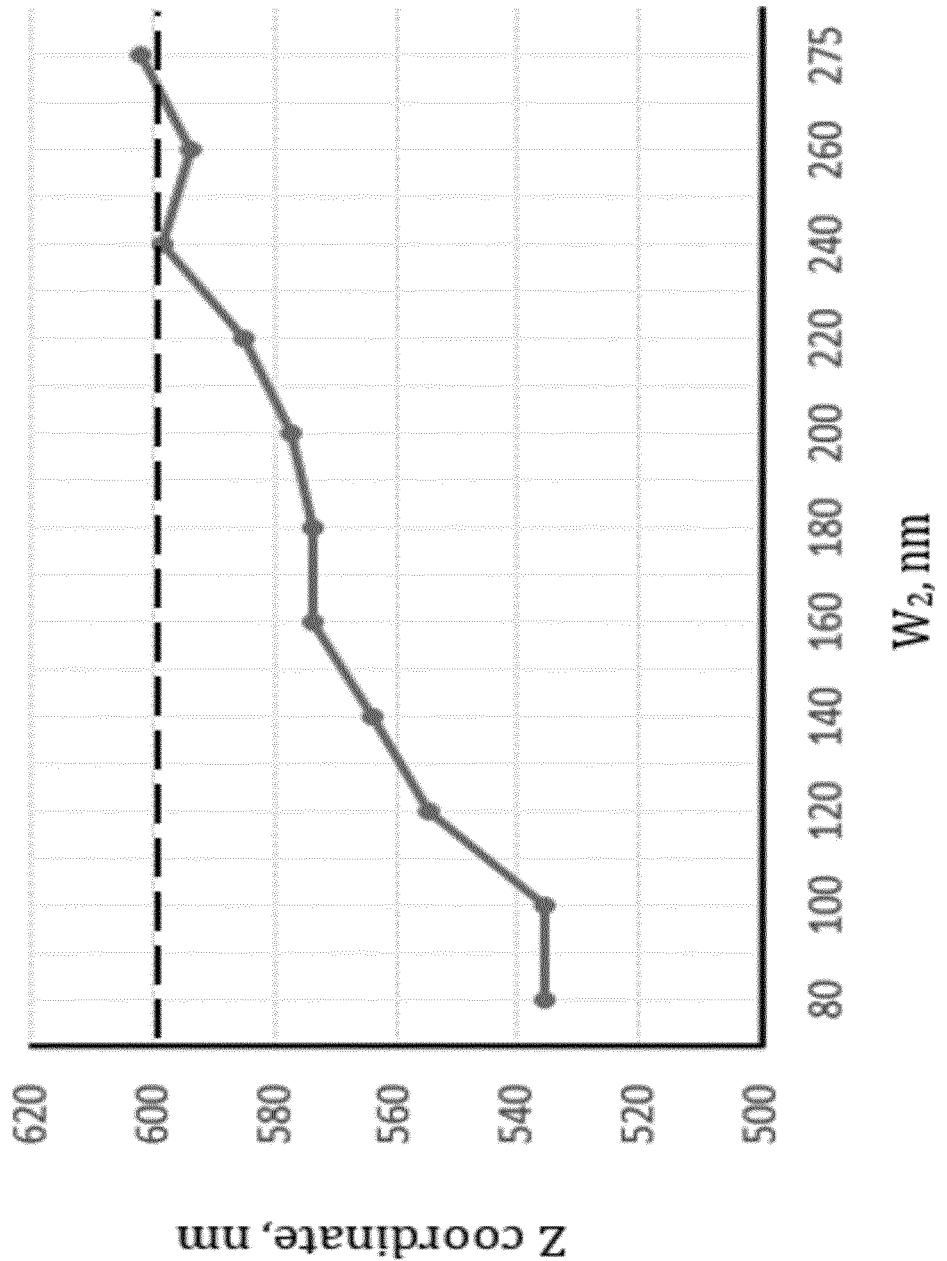

The dependence of the maximal power density on the half-width (radius) of the second layer $W_2$ is presented in FIG. 4(a). The dashed black horizontal line shows the reference solution for the single step microlens. It can be seen that, if parameters of the second layer are close to the optimal, we can get the maximal value of power distribution. The maximal power density is observed for the double step nanojets lens with $W_2=120$ nm. Changing the dimensions of the second layer we can change the position of the nanojets hot spot. FIG. 4(b) shows the dependence of Z coordinate of NJ hot spot on $W_2$. The dashed black horizontal line shows the position of the top of the system.

It can be seen that in all cases the beam width at half power (BWHP) is about 200 nm, which is below the diffraction limit which predicts the smallest possible focal spot size of about ½ of the wavelength in the host medium. As expected, the maximum power density is observed for the nanojets lens with optimal parameters ($W_2=120$ nm), whose focal spot BWHP is about 170 nm, which is in part explained by the improved focusing ability of the double-step nanojets lens and the shift of the focal spot inside the lens with a refractive index value higher than that of the host medium.

Figure 5A:
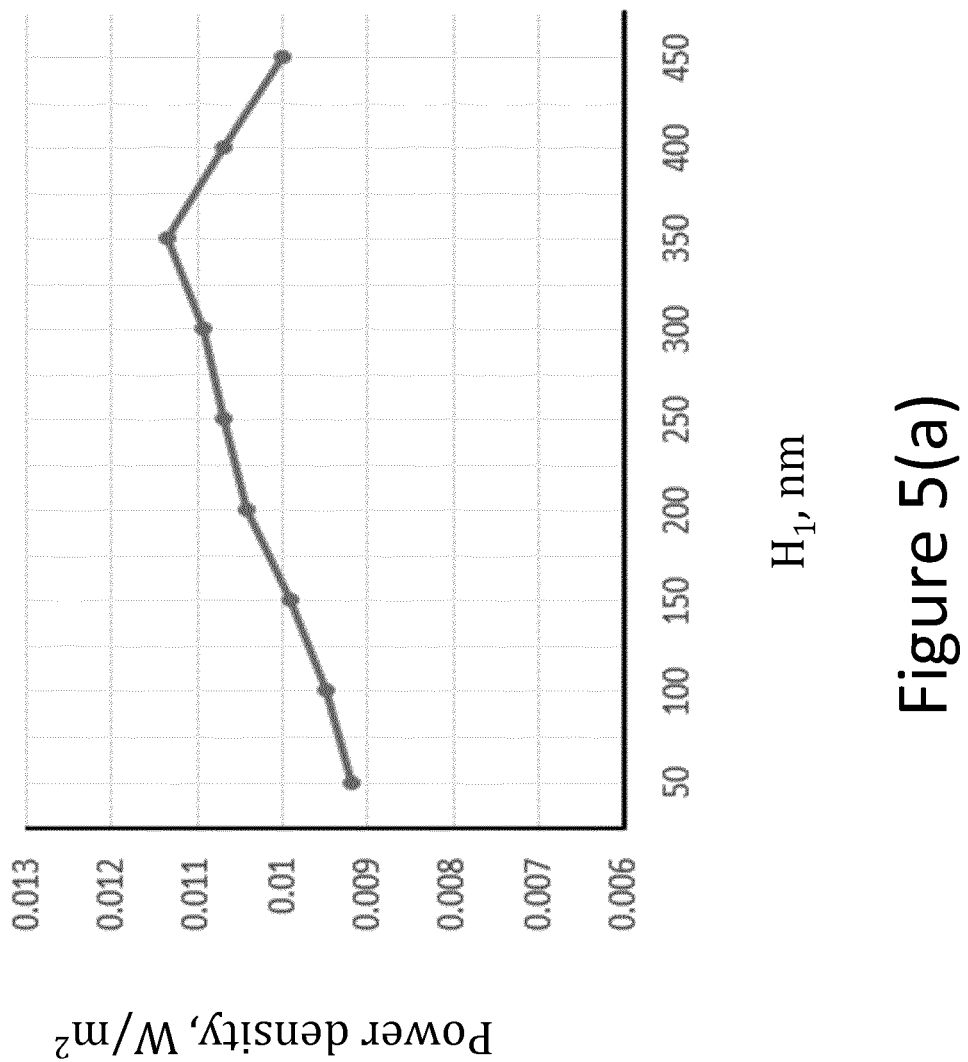
FIGS. 5(*a*) and (*b*) present the power density distribution along x-axis at $\lambda=550$ nm for the systems with such parameters: $n_1=1$, $n_2=n_3=1.49$, $W_1=275$ nm, $W_2=120$ nm, with $H_1+H_2=620$ nm (a) and with $H_1=350$ nm (b)
Figure 5B:
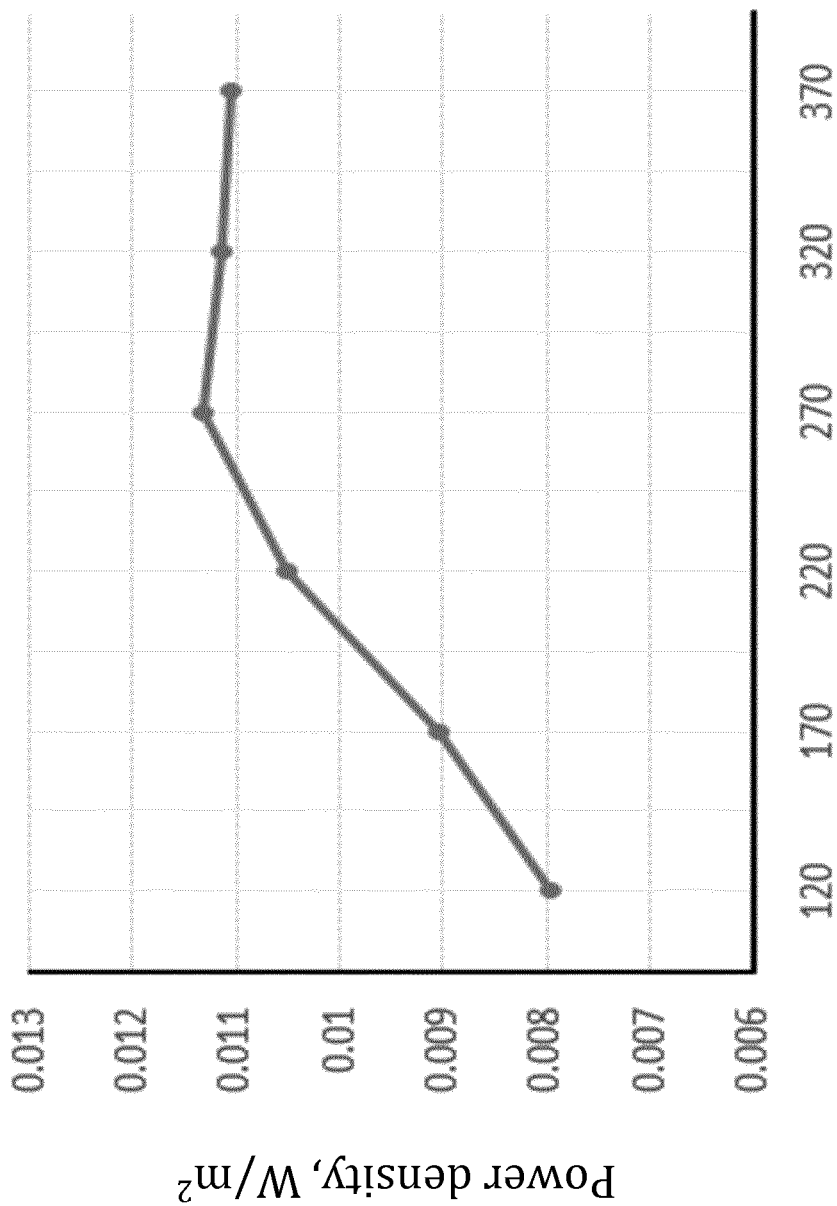

As we can see in FIGS. 5(a)-(b), the power density distribution is sensitive to the heights of the steps of the nanojets lens. The peak power density is observed for $H_1=350$ nm and $H_2=270$ nm which are close to the optimal heights of the steps. As the result, we can conclude that the equations $H_2 \approx W_1\gamma - H_1$ and $$W_2 \approx \frac{H_2}{\gamma}$$

for two nanojets hot spot adjustment does not work for the case when $H_{1,2} < \lambda/4$. In this case, we observe two nanojets hot spots.

In order to evaluate the effect of the materials of the layers on the nanojets properties, the power density distributions have been simulated at the modified ratios $$\beta = \frac{n_2}{n_1}$$

Figure 6:
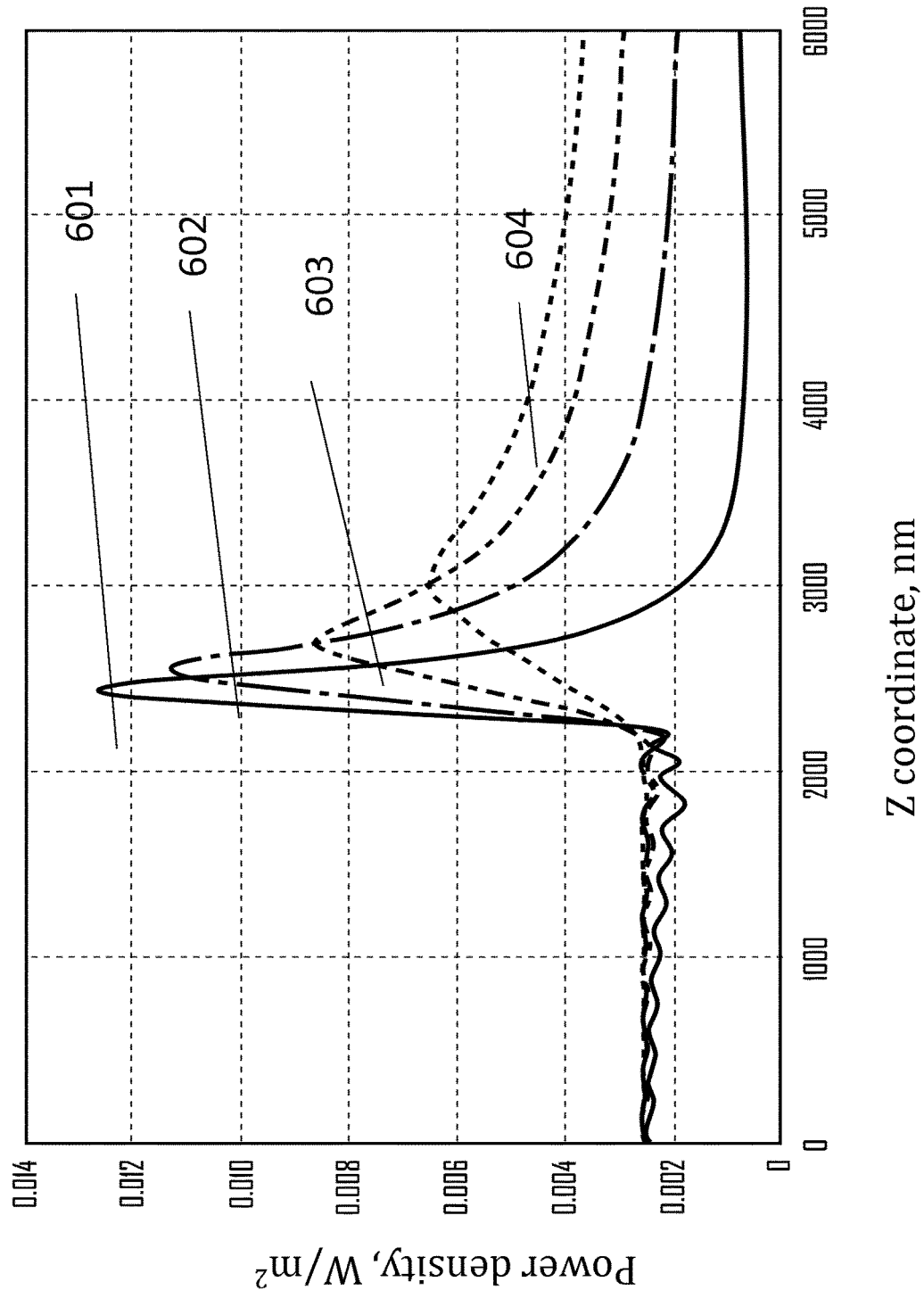
FIG. 6 presents the power density distributions for different values of the ratio $$\beta = \frac{n_2}{n_1};$$

(see FIG. 6). It is possible to see that peak value of power density rises with β, but the length of the beam decreases in this case. In FIG. 6, the curve referenced 601 corresponds to $\beta=1.8$ ($W_2=100$ nm, $H_2=164$ nm), the curve referenced 602 corresponds to $\beta=1.49$ ($W_2=120$ nm, $H_2=268$ nm), the curve referenced 603 corresponds to $\beta=1.3$ ($W_2=150$ nm, $H_2=410$ nm) and the curve referenced 604 corresponds to $\beta=1.15$ ($W_2=182$ nm, $H_2=691$ nm).

Figure 7:
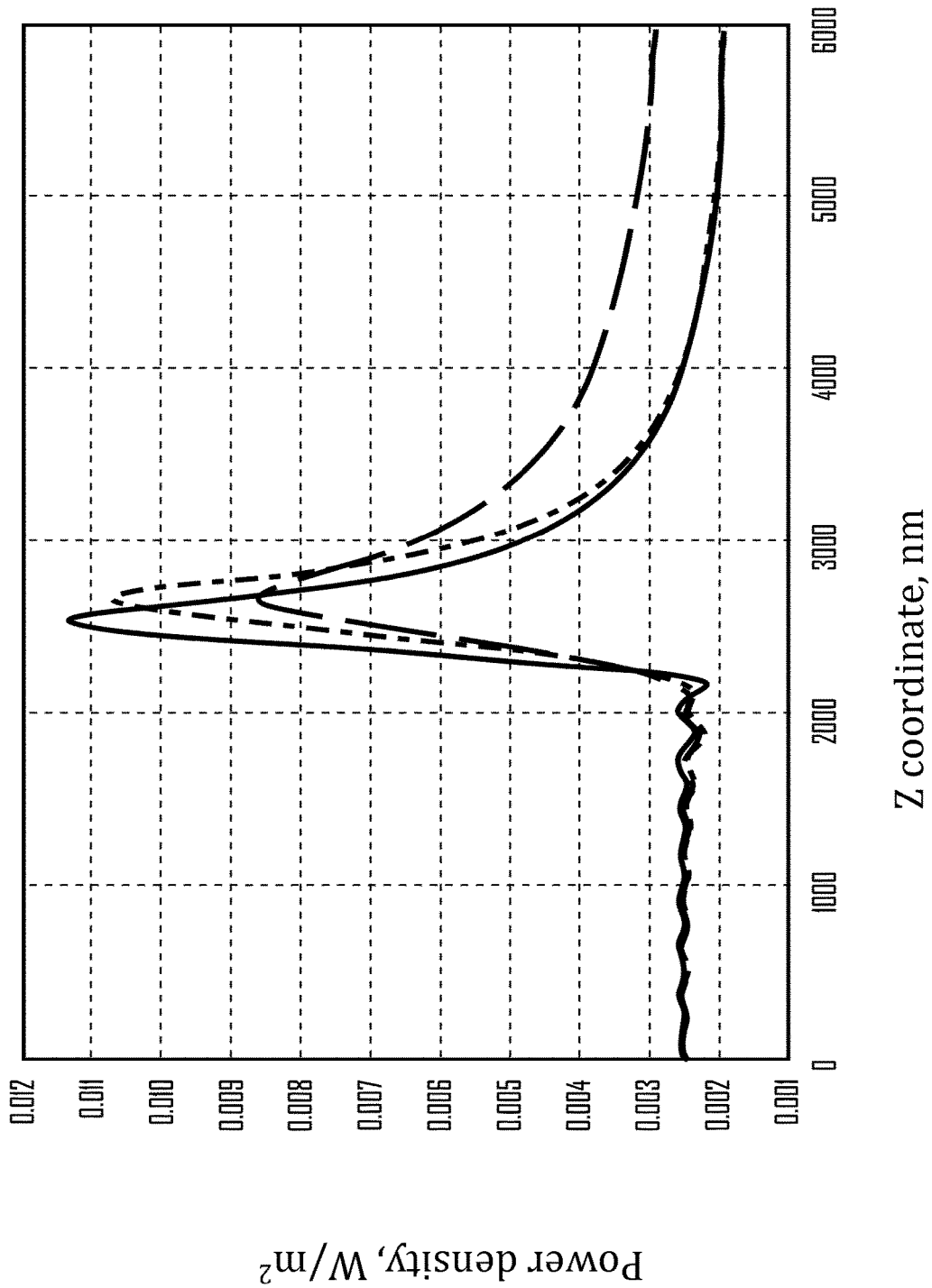
FIG. 7 presents the power density distribution along z-axis at $\lambda=550$ nm for the systems with optimized parameters: $W_1=275$ nm, $n_1=1$, $H_1=350$ nm, with the following set of parameters (represented by the dashed curve): $n_2=n_3=1.3$, $W_2=150$ nm, $H_2=410$ nm; with the following set of parameters (represented by the dash-dot curve): $n_2=1.3$, $n_3=1.49$, $W_2=140$ nm, $H_2=410$ nm; with the following set of parameters (represented by the solid curve): $n_2=n_3=1.49$, $W_2=120$ nm, $H_2=268$ nm.
Figure 8A:
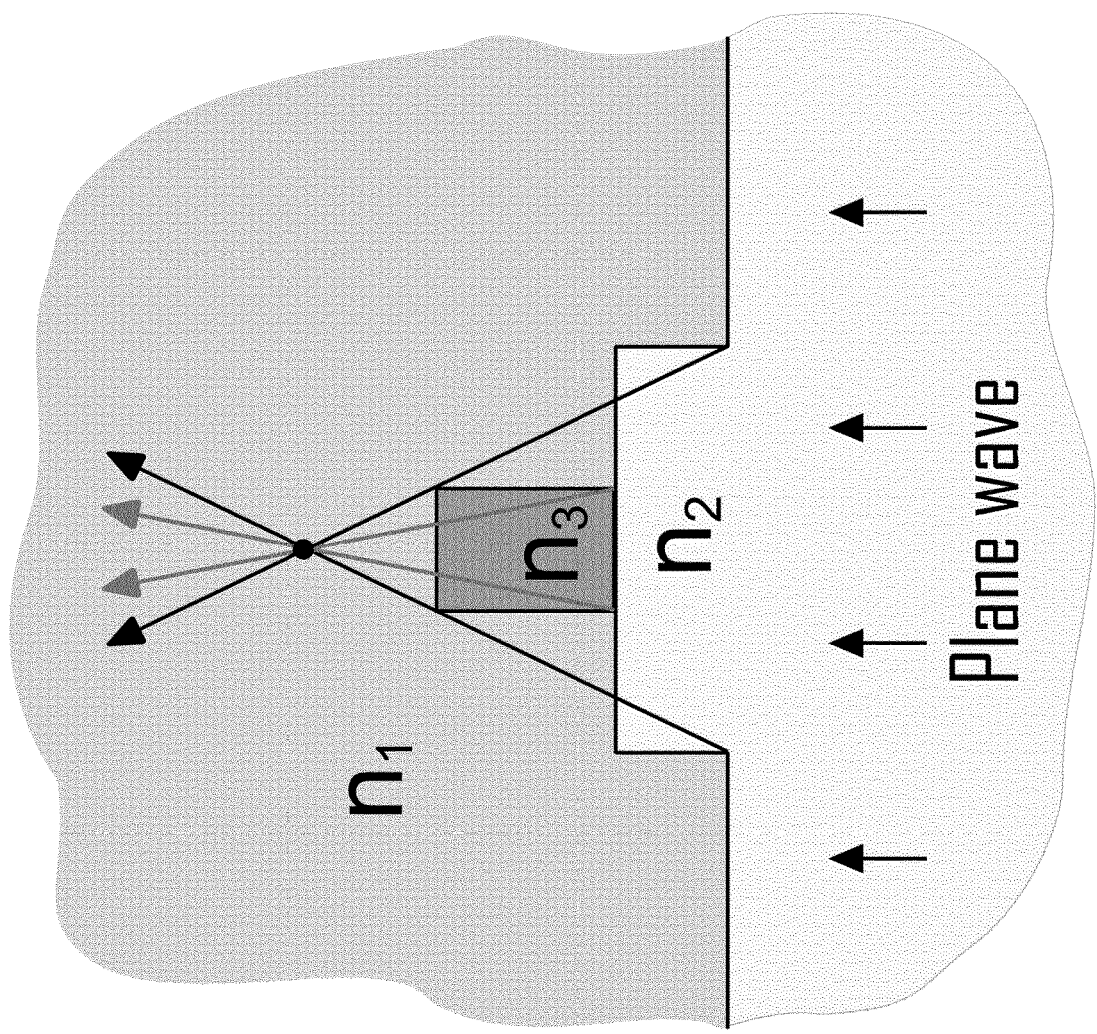
FIGS. 8(*a*) and (*b*) present a schematic cross-section view of possible embodiments of double steps nanojets lenses, placed on a dielectric substrate for which the following relationship for refractive indexes of layers/elements is fulfilled $n_1 < n_3 < n_2$.
Figure 8B:
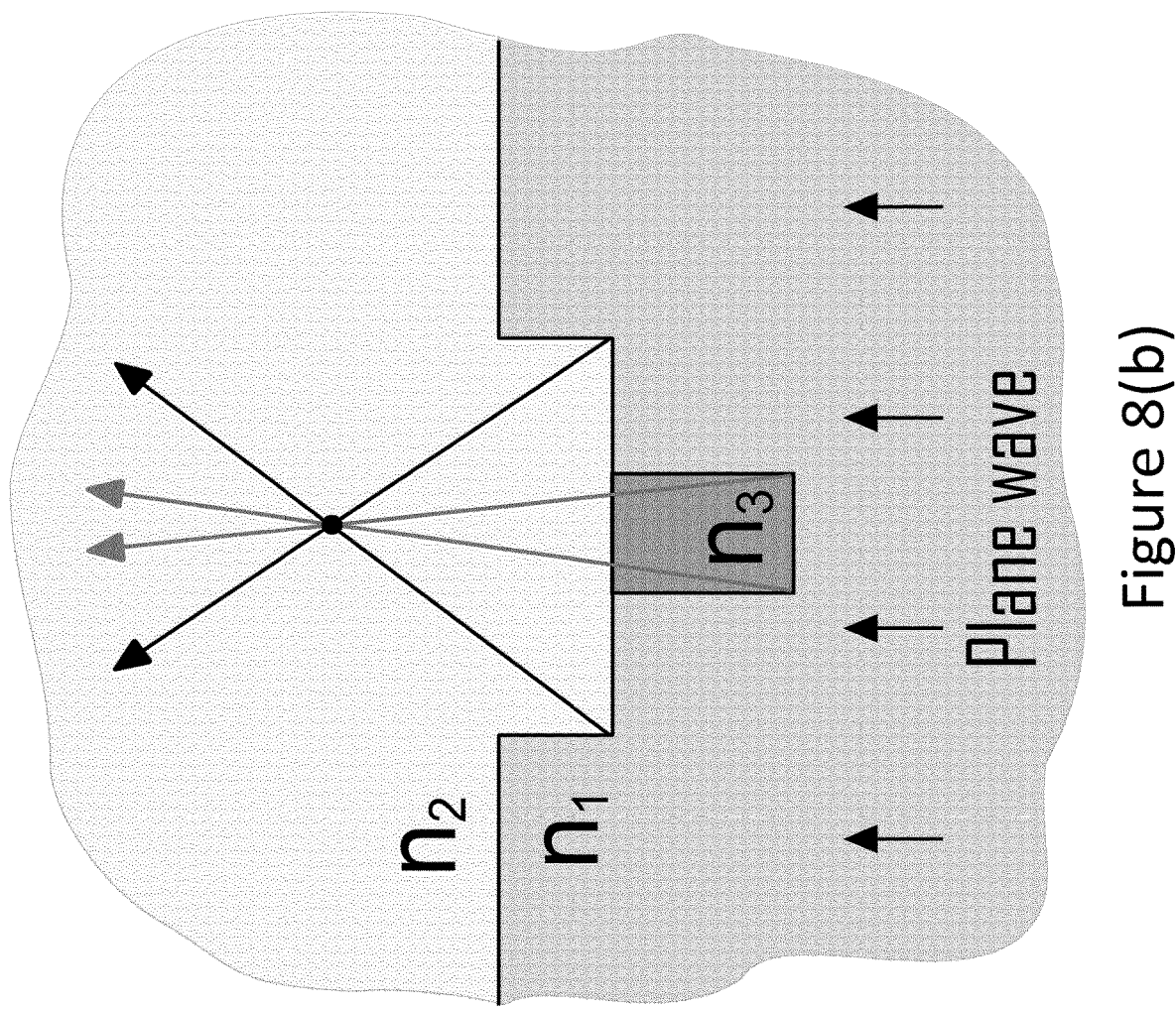
Figure 9:
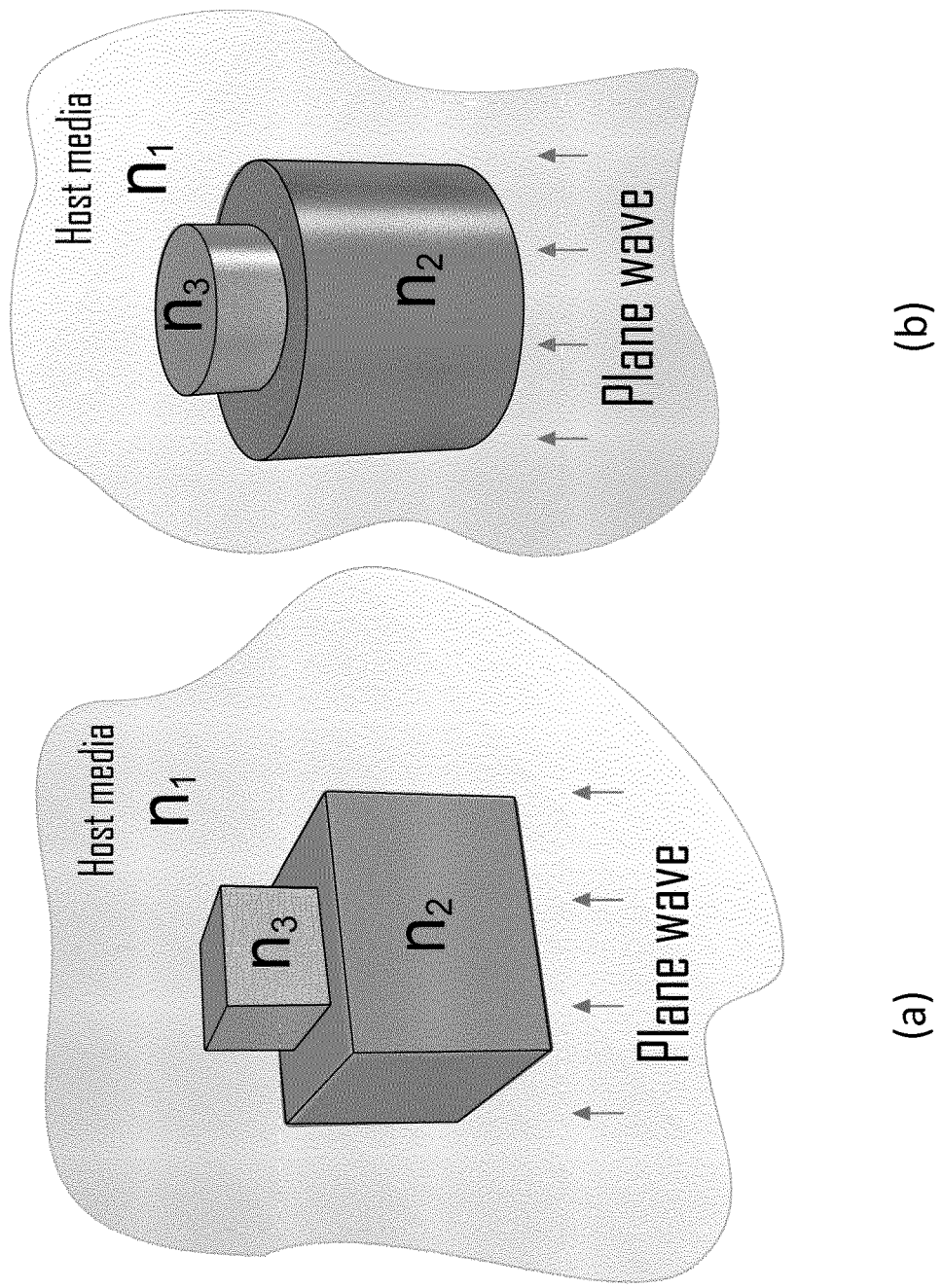
FIGS. 9(*a*)-(*d*) present schematic views of possible embodiments of double-steps nanojets lenses.
Figure 9:
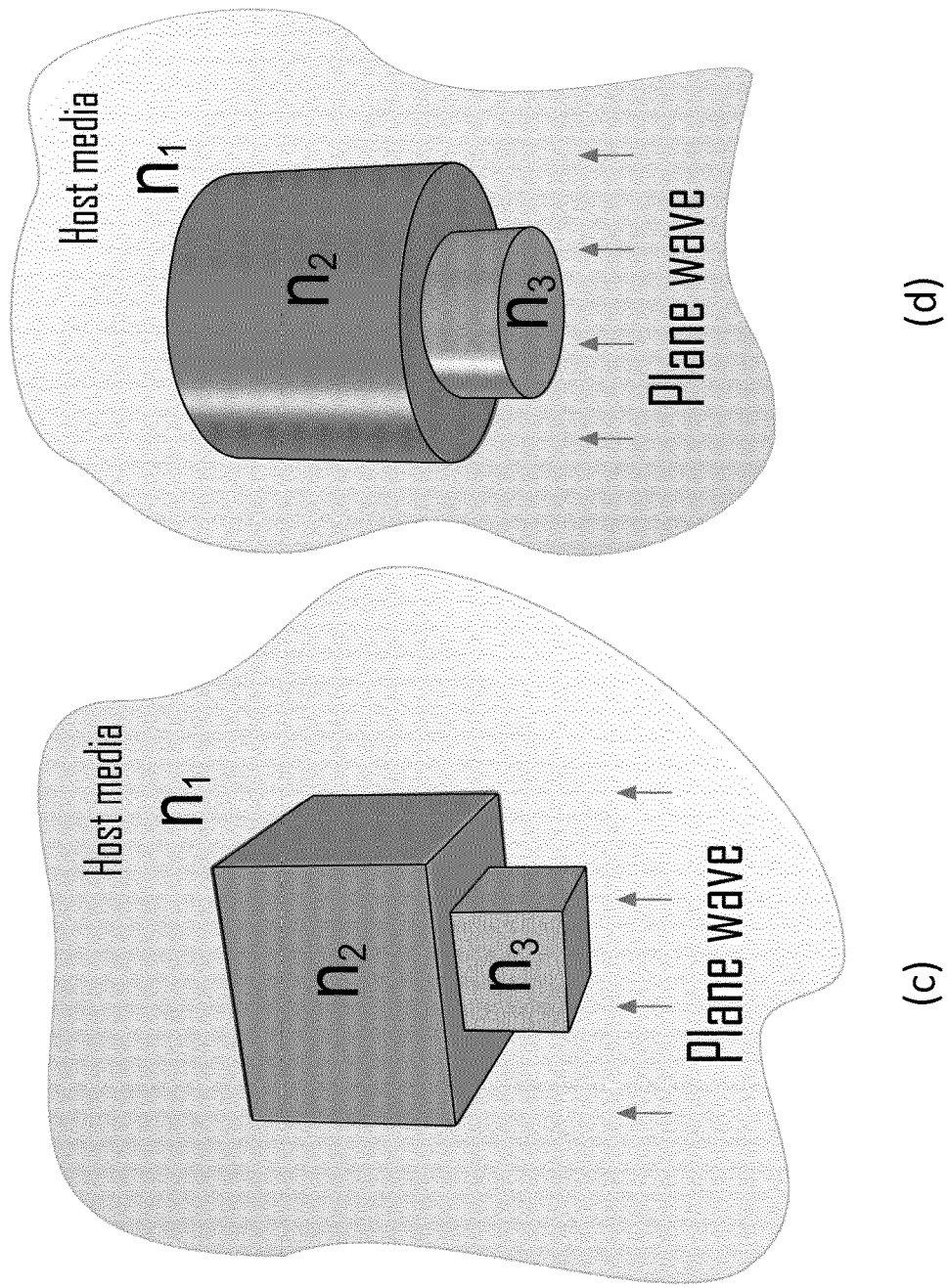

Comparison of the curves in FIG. 7 for different combinations of refractive indexes of the layers demonstrates that combinations of different materials qualitatively alter the power distribution along the z-axis. Namely, we can observe that when $n_3 > n_2$ we can get higher peak (up to 25%) of power density distribution at smaller width of the second layer. But in this case the length of the nanojets beam will be nearly equal to the length of the beam obtained for the step-like nanojets lens with $n_3=n_2=1.49$ and optimized smaller dimensions.

One advantage of the proposed technique is that it enables additional degrees of freedom for the control over nanojets beam in the near zone and, in particular, it enhances the field intensity in the focal spot of the double steps nanojets lens. These "degrees of freedom" are provided by adding additional steps giving rise to independent nanojets beams that all together contribute to the formation of a high intensity secondary beam.

In such a case, characteristics of the secondary nanojets beam (i.e. field intensity, beam width, and orientation) are determined by the partial contribution of multiple independent beams associated with different steps.

In the case of a symmetrical structure (like the one presented in the FIGS. 1(b)-(c)) the secondary beam is located on axis of the lens, however its orientation can be modified by breaking the symmetry of the structure, e.g. changing the base angles of selected steps.

A few possible realizations of the step-like nanojets lenses are presented in FIGS. 8(a)-(b), and FIGS. 9(a)-(d). Such nanojets lenses can be embedded in a host medium or placed on a dielectric substrate acting as a support layer. Material of the substrate can be selected arbitrary. It can be the same or different from the material of the wider step. In addition, the implementation of such microstructures is possible via standard lithography techniques.

It should be noted that such structure can be illuminated both from the top or bottom, however, to provide the desired focusing function, material properties and dimensions of the steps must be adjusted accordingly (see FIG. 7).

To illustrate the influence of the step-like topology on the parameters of the nanojets beams in the case of lenses with bigger dimensions, we considered the system with the following parameters: $n_1=1$, $n_2=n_3=1.8$, $W_1=550$ nm, $H_1=400$ nm. The presented simulations were done for 2D problem. The nanojets lens is assumed to be infinite along y-axis (rib-type) and is illuminated by a linearly-polarized plane wave $E=\{0,1,0\}$.

Figure 10A:
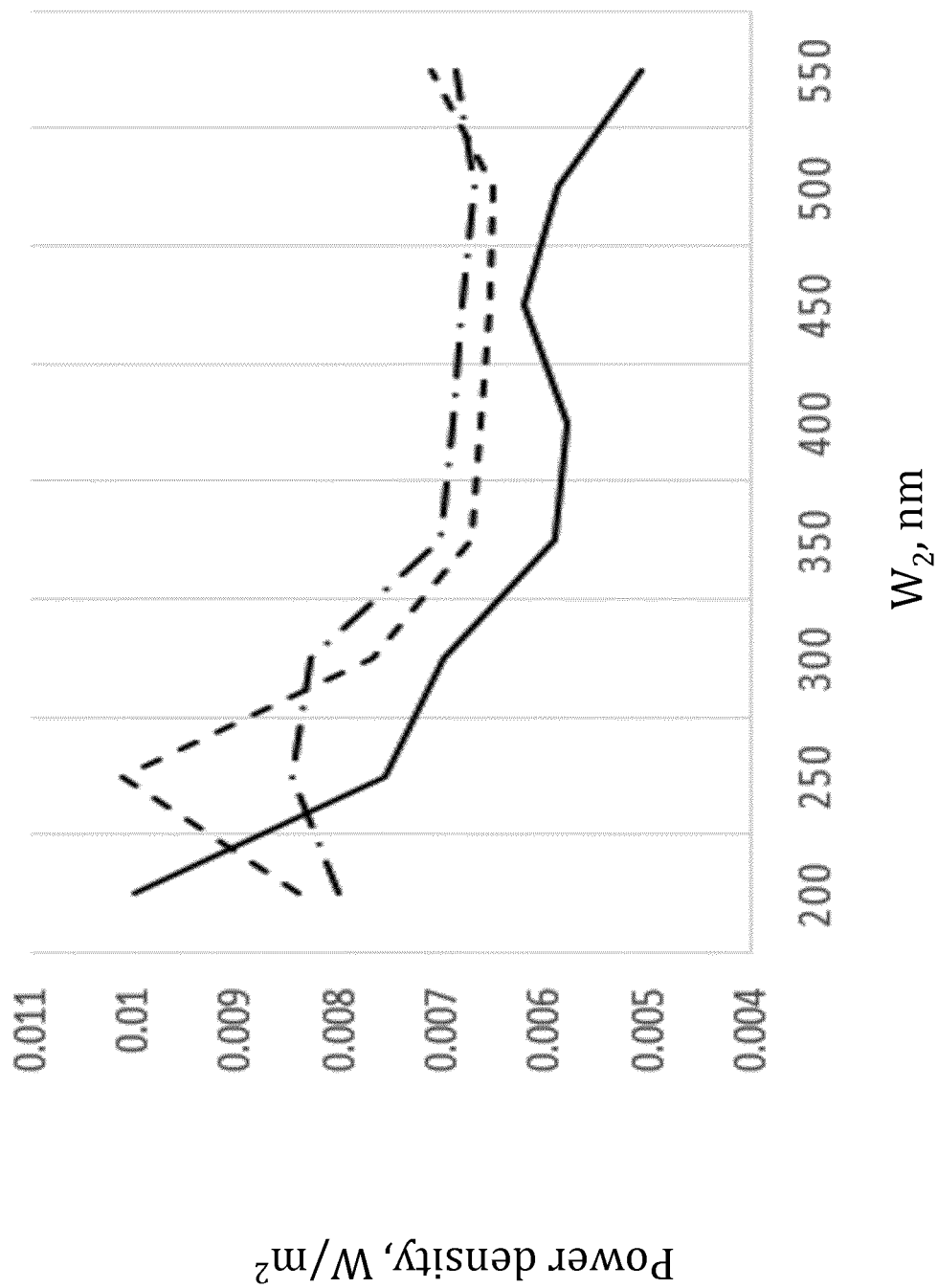
FIGS. 10 (*a*) and (*b*) present respectively the peak power density and Z-coordinate of nanojets hot spot versus $W_2$ for a double-steps nanojets lens with such parameters: $n_1=1$, $n_2=n_3=1.8$, $W_1=550$ nm, $H_1=400$ nm, $H_2=250$ nm, illuminated by a unit-amplitude plane wave at $\lambda=450$ nm (solid curve), $\lambda=550$ nm (dashed curve) and $\lambda=650$ nm (dash-dot curve)
Figure 10B:
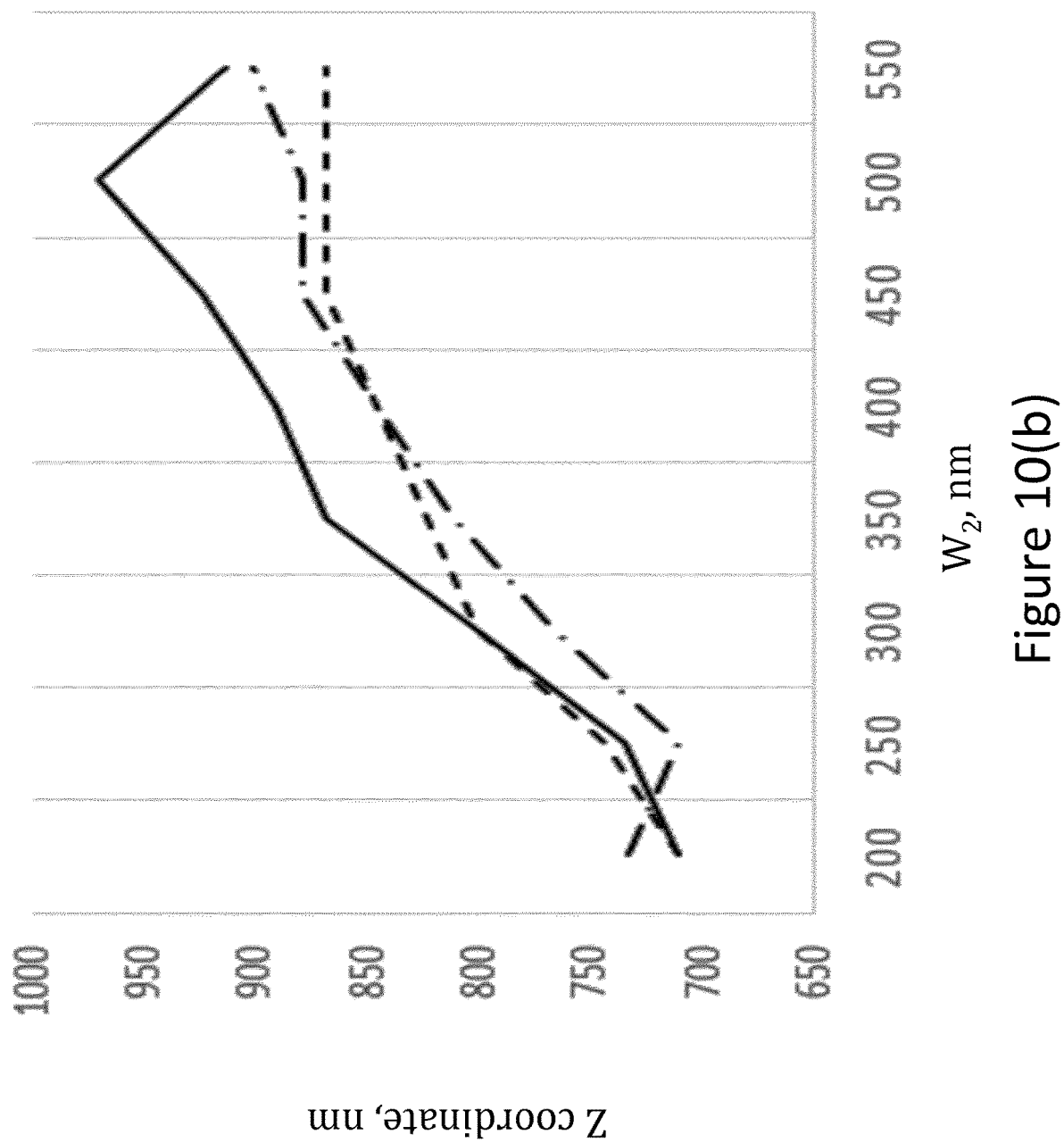

Using the equations $H_2 \approx W_1\gamma - H_1$ and $$W_2 \approx \frac{H_2}{\gamma}$$

we obtain that the optimal dimensions of the second step are $W_2=336.2$ nm and $H_2=689.8$ nm. FIGS. 10(a) and (b) show the dependence of the maximal power density and Z coordinate of nanojets hot spot on the half-width (radius) of the second layer $W_2$ at 3 different wavelengths.

The numerical simulations demonstrate that the equations $H_2 \approx W_1\gamma - H_1$ and $$W_2 \approx \frac{H_2}{\gamma}$$

do not work in this case. First of all, to get the focal point outside the nanojets lens we should take much lower height of the second step. In the presented case, it was just $H_2=250$ nm. Moreover, the maximal power density was observed for the smaller sizes $W_2$. It is also necessary to note that the system is very sensitive to the wavelength of electromagnetic wave. But it is possible to see that the double steps-like topology gives more intensive total response of the system (up to 200% in the case of $\lambda=450$ nm for $W_2=200$ nm) compare to the single step system of the same height ($W_1=W_2=500$ nm).

Figure 11:
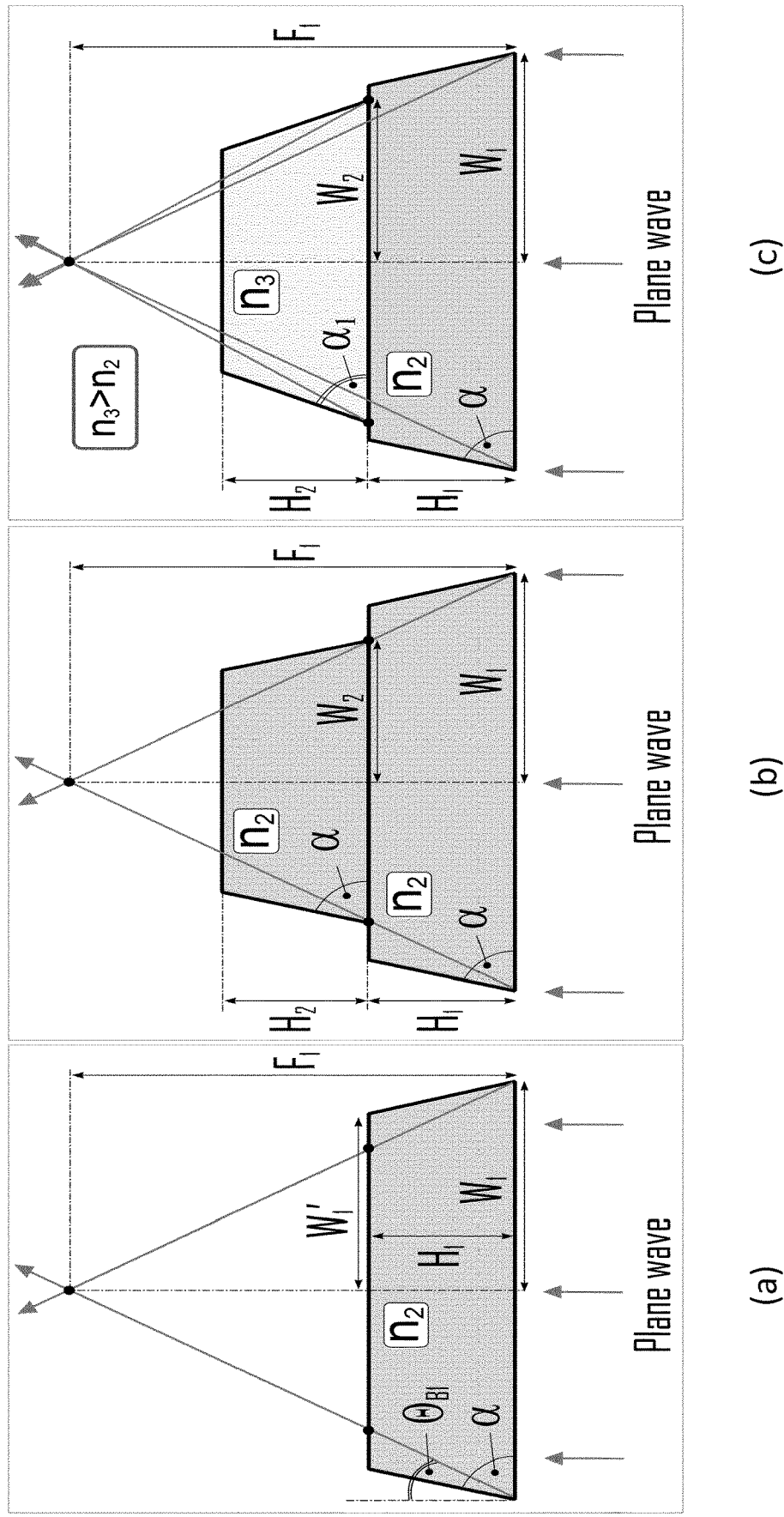
FIG. 11(*a*)-(*c*) presents cross-section views of a double steps nanojets lens with nonvertical edges.

In the following, we consider the structures with non-vertical edges and top/bottom surface parallel to xy-plane. Let us assume that α is the base angle for a single step/layer system (see FIG. 11(a)). The general topologies of the single step and double-steps nanojets lenses are illustrated in FIGS. 11(a)-(c). These cross-section views may correspond to the prismatic systems embedded in a homogeneous dielectric host media with a refractive index $n_1 < n_2$.

It was obtained that for the systems with non-vertical edges the nanojets beam radiation angle can be determined using the approximate formula:

$$\Theta_{B1} \approx \frac{90° - \Theta'_{TIR}}{2}$$

where $\Theta'_{TIR}$ is the critical angle of refraction from the nonvertical edge. To get the approximate formula for $\Theta'_{TIR}$, we must take into account the changing of the position of the edge. As the result, the nanojets beam radiation angle can be estimated as:

$$\Theta_{B1} \approx 90° - \frac{\Theta_{TIR} + \alpha}{2}$$

In order to increase the intensity in the nanojets hot spot, we can adjust nanojets beams related to the steps of the system. As the result, the formula for the radius/half width of the bottom edge of the top layer can be written as:

$$W_2 \approx W_1 - H_1 \tan \Theta_{B1}$$

We have assumed that the base angle of the top layer coincides with the base angle of a bottom one. We should mention that to estimate the focal length of the steps, we should take into account electromagnetic wave refraction phenomena at the top surface of the layers. For such geometry, the equation $F_j = W_j/\gamma$, previously used, gives relatively big calculating error. Moreover, all presented formulas are valid only for $\alpha > 90° - \Theta_{B1}$.

For a step-like system with the different refractive indexes of the materials of the steps and different base angles of the constitutive parts (see FIG. 11(c)), we should use the same principle as it was discussed previously.

The proposed concept is validated numerically via full-wave electromagnetic analysis of a step-like nanojets lens in a form of a prism, whose cross-section is represented in FIG. 11(b). The presented simulations were done for 3D problem. The lens is illuminated by a linearly-polarized plane wave E={0,1,0}. The materials of the steps of the nanojets lens are the same ($n_2 = n_3$), the base angles for the constitutive parts are the same. To illustrate the influence of modified nanojets lens topology on the parameters of the nanojets, we consider the system with the following parameters: $n_1=1$, $n_2=n_3=1.5$, $W_1=275$ nm and $H_1=200$ nm.

By using the equation $W_2 \approx W_1 - H_1 \tan \Theta_{B1}$, we can determine that the optimal radius of the second step for a base angle $\alpha=87.2°$ is $W_2=179.6$ nm. The FIG. 12(a) shows the dependence of the peak of the power density on the radius $W_2$. For a chosen height of the second step ($H_2=200$ nm), we observe the nanojets hot spot inside the structure/system. We can see that the maximal power density corresponds to the step-like nanojets lens with $W_2=205$ nm. Dashed black curve in FIG. 12(a) corresponds to the reference solution, namely a single step nanojets lens with non-vertical edges ($\alpha=87.2°$) of the same total height (400 nm) and with $W_1=275$ nm. The dependence of peak power density on $W_2$ for a system with lower base angle ($\alpha=80.1°$) is presented in FIG. 12(b). To get the focal spot outside the system we take $H_2=100$ nm. It was obtained that the optimal radius of the second step for such system corresponds to $W_2=164$ nm. The maximal power density was observed for the double-steps nanojets lens with $W_2=180$ nm. The dashed curve in the FIG. 12(b) corresponds to the single step reference solution ($\alpha=80.1°$, $W_1=275$ nm, $H_1=300$ nm). Hence, we can conclude that by choosing the optimal parameters of the layers for the double-steps nanojets lenses with nonvertical edges, we can get more intensive total response of the system.

Let us now consider the effect of the angle of plane wave incidence on the properties of generated nanojets beam.

We assume that $\Theta_i$ is the angle of electromagnetic wave incidence.

Figure 13:
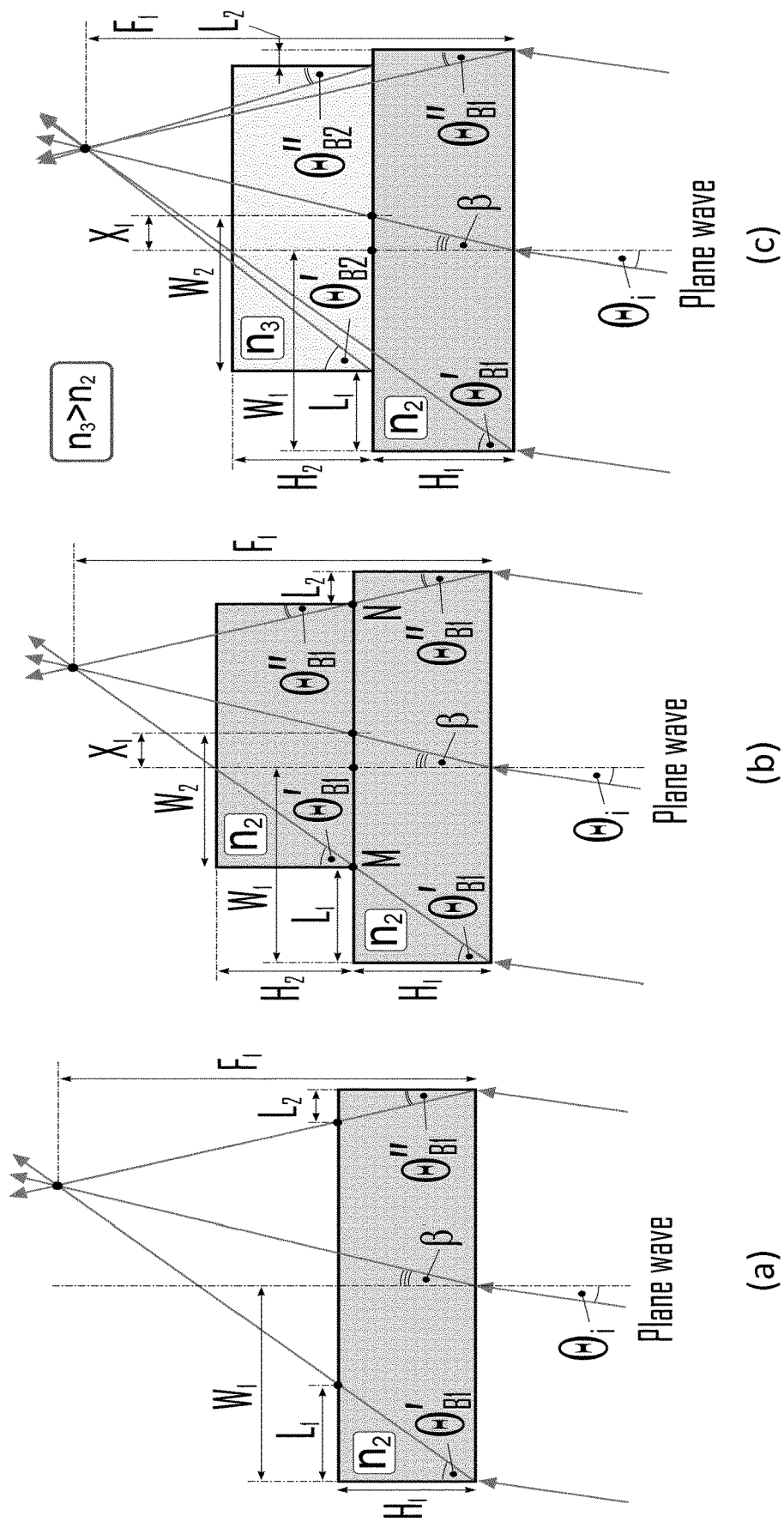
FIGS. 13(a)-(c) present some cross-section views of a double-steps nanojets lens according to different embodiments of the disclosure, when an oblique electromagnetic wave hits the double-steps nanojets lens.

To get the approximate formula for nanojets beam radiation angles in the case of plane wave oblique incidence on the element with refractive index $n_2$, we should take into account that the radiation angles for opposite edges of the system are not equal (see FIG. 13(a)). As the result, for a single-step element we can have $$\Theta'_{B1} \approx \frac{90° - \theta_{TIR}}{2} + \frac{\Theta_i}{2},$$

$$\Theta''_{B1} \approx \frac{90° - \theta_{TIR}}{2} - \frac{\Theta_i}{2}.$$

It is necessary to note, that for nanojets lens with the focal spot (hot spot of the total generated nanojets) inside the system, angle of total nanojets deviation can be determined as $$\tan\beta = \frac{\tan\Theta'_{B1} + \tan\Theta''_{B1}}{2}.$$

Therefore, in order to determine the focal length of the nanojets lens with hot spot outside the system ($F_1$), we should take into account the additional electromagnetic wave refraction at the top edge of the system. As the result, we obtain that angle of total nanojets deviation will be approximately equal to the angle of incidence $\Theta_i$.

To increase the intensity in the nanojets hot spot, we should adjust the focal lengths of the constitutive elements of the step-like system as it was done before considering the difference between the nanojets beam radiation angles for the opposite edges of the system. As the result, the double-step system (FIG. 13(b)) will not be symmetrical. For a single-material double-step nanojets lens we have:

$$L_1 = H_1 \tan \Theta'_{B1}$$

$$L_2 = H_1 \tan \Theta''_{B1}$$

In this case additional nanojets related to the second step will be superimposed with the nanojets for a first step.

So, the parameters of the second step can be determined using the approximate formulas:

$$W_2 = W_1 - H_1 \frac{\tan\Theta'_{B1} + \tan\Theta''_{B1}}{2}$$

$$X_1 = W_1 - L_2 - W_2$$

where $X_1$ is the shift between the axis of the symmetry for the steps. The presented formulas are valid for positive angles of incidence and $L_2<L_1$. In the case of negative angles $\Theta_i$, we obtain that $L_2>L_1$.

For nanojets beam radiation in the case of plane wave oblique incidence on the element with nonvertical edges, we should just use modified approximate equations for the radiation angles $$\Theta'_{B1} \approx 90° - \frac{\theta_{TIR} + \alpha}{2} + \frac{\theta_i}{2},$$

$$\Theta''_{B1} \approx 90° - \frac{\theta_{TIR} + \alpha}{2} - \frac{\theta_i}{2}.$$

It is necessary to note, that if materials of the steps are different (FIG. 13(c)), we should use these approximate formulas just for preliminary estimation of the second step size taking into account that for $n_3>n_2>n_1$, $\Theta'_{B1}<\Theta'_{B2}$ and $\Theta''_{B1}<\Theta''_{B2}$, and for $n_3<n_2$ $(n_{2,3}>n_1)\Theta'_{B1}>\Theta'_{B2}$ and $\Theta''_{B1}>\Theta''_{B2}$. It means that for a proper adjustment, the dimensions of the top step should be corrected: for $n_3>n_2$, the total width (radius) of the top step should be increased, for $n_3<n_2$, the total width (radius) of the top step should be less than the optimal one. Moreover, we should take into account the refraction phenomena associated with the top edges of the first and second steps (first and second layers) leading to the considerable decrease of the focal distance for proposed system.

Therefore, in order to determine the optimal geometry of double-steps nanojets lens with different materials of the steps, we should take into account that the angles of nanojets deviation by both steps are approximately equal to the angle of incidence $\Theta_i$. So, to get the proper adjustment of the focal points in this case, it is important to determine the shift between the axis of the symmetry for the steps as $$X_1 = H_1 \tan \Theta_i,$$

and to take into account the dimensions of the second layer.

The proposed concept is validated numerically via full-wave electromagnetic analysis of a step-like nanojets lens in a form of a cylinder, whose cross-section is represented in FIG. 13(b). The presented simulations were done for 3D problem. The lens is illuminated by a linearly-polarized plane wave $E=\{0,1,0\}$. The materials of the steps of the nanojets lens are the same ($n_3=n_2$). To illustrate the influence of the nanojets lens topology on the parameters of the nanojets beams in the case of oblique plane wave incidence, we consider the system with the following parameters: $n_1=1$, $n_2=n_3=1.5$, $W_1=275$ nm, $H_1=200$ nm.

Using the equations $L_1=H_1 \tan \Theta'_{B1}$, $L_2=H_1 \tan \Theta''_{B1}$, $$W_2 = W_1 - H_1 \frac{\tan\Theta'_{B1} + \tan\Theta''_{B1}}{2}$$

and $X_1=W_1-L_2-W_2$ we can determine the optimal radius of the second step which is $W_2=183.7$ nm and shift between the axes of the symmetry for the layers is $X_1=31.7$ nm.

The FIG. 14(a) shows the peak power density distribution along z-axis for six different values of $W_2$ at fixed shift $X_1=30$ nm. To get the focal spot outside the system we take $H_2=100$ nm. The maximal power density is observed for the step-like nanojets lens with $W_2=200$ nm. We should mention that changing of the sizes of an additional layer leads to the shift of the nanojets hot spot position (see FIGS. 14(b) and 14(c)). The dashed curves in the FIGS. 14(a)-(c) correspond to the reference solution, namely a single step nanojets lens of the same total height. The dependence of the maximal power density on the parameter $X_1$ for second layer with $W_2=200$ nm is presented in FIG. 15(a). The dashed horizontal line shows the reference solution for the single step nanojets lens. It can be seen, that if for oblique plane wave incidence size and position of the second layer are close to the optimal, we can get the maximal value of power distribution.

The invention claimed is:

1. A device for generating and guiding nanojet beams from an incident electromagnetic wave that is incident on the device, the device comprising:
    a host medium having a first refractive index value;
    a first layer comprising a first dielectric material having a second refractive index value, wherein the second refractive index value is greater than the first refractive index value, and wherein the first layer comprises a first step structure and a third step structure at a boundary between the first layer and the host medium, wherein the first step structure and the third step structure face each other and are separated from each other by a first distance; and
    a second layer comprising a second dielectric material and comprising a second step structure and a fourth step structure at a boundary between the second layer and the host medium, the second layer having a third refractive index value higher than the first refractive index value of the host medium, wherein the second step structure and the fourth step structure face each other and are separated from each other by a second distance that is smaller than the first distance, wherein the second step structure is stacked on the first step structure and wherein the fourth step structure is stacked on the third step structure, wherein each of the first step structure, the second step structure, the third step structure, and the fourth step structure is configured such that, in response to the incident electromagnetic wave reaching the device in a direction from the first layer toward the second layer, nanojet beams originating from edges of the first step structure, the second step structure, the third step structure, and the fourth step structure are combined at a focal spot to form a single high-intensity nanojet beam.

2. The device of claim 1, wherein:
    the incident electromagnetic wave is a plane wave,
    the device is configured such that the plane wave incident on the device is normal to the first layer,
    the first step structure includes a first edge, a first bottom surface, and a first base angle between the first edge and the first bottom surface,
    the second step structure includes a second edge, a second bottom surface, and a second base angle between the second edge and the second bottom surface, and
    the first base angle and second base angle are equal to 90 degrees.

3. The device of claim 2,
    wherein the first step structure further comprises a first top surface and the second step structure further comprises a second top surface;
    wherein the first bottom surface of the first step structure and the first top surface of the first step structure are parallel to a first plane, and the first edge of the first step structure is parallel to an axis perpendicular to the first plane; and wherein the second bottom surface of the second step structure and the second top surface of the second step structure are parallel to the first plane; and wherein the second edge of the second step structure is parallel to the axis.

4. The device of claim 1, wherein the first step structure and the third step structures have a same first height $H_1$, wherein the second step structure and the fourth step structure have a same second height $H_2$, wherein the second height $H_2$ has a value around $$\left(\frac{d_1}{2}\right) \cdot \gamma_1 - H_1,$$

wherein $d_1$ is the first distance, and $\gamma_1$ is around $$\frac{1}{\tan|\Theta_{B1}|},$$

where $\Theta_{B1}$ is a nanojet beam radiation angle generated by the first step structure and the third step structure, wherein $$\Theta_{B1} \approx \frac{90° - \Theta_{TIR_1}}{2}$$

where $$\Theta_{TIR1} = \sin^{-1}\left(\frac{n_1}{n_2}\right)$$

is a first critical angle of refraction, $n_1$ is the first refractive index value of the host medium, $n_2$ is the second refractive index value of the first layer, wherein $$\left(\frac{d_2}{2}\right)$$

has a value around $H_2/\gamma_2$, wherein $d_2$ is the second distance, $\gamma_2$ is around $$\frac{1}{\tan|\Theta_{B2}|},$$

where $\Theta_{B2}$ is a nanojet beam radiation angle generated by the second step structure and the fourth step structure, and wherein $$\Theta_{B2} \approx \frac{90° - \Theta_{TIR_2}}{2}$$

where $$\Theta_{TIR2} = \sin^{-1}\left(\frac{n_1}{n_3}\right)$$

is a second critical angle of refraction, and $n_3$ is the third refractive index value of the second layer.

5. The device of claim 1, wherein:
the device is configured such that the incident electromagnetic wave is a plane wave that is normal to the first layer and the second layer,
the first step structure includes a first edge, a first bottom surface, and a first base angle between the first edge and the first bottom surface,
the second step structure includes a second edge, a second bottom surface, and a second base angle between the second edge and the second bottom surface, and
the first base angle and the second base angle are equal to an angle α.

6. The device of claim 5, wherein the first step structure and the third step structure have a same first height $H_1$, wherein the second step structure and the fourth step structure have a same second height $H_2$, wherein the second height $H_2$ has a value around $$\left(\frac{d_1}{2}\right) \cdot \gamma_1 - H_1,$$

wherein $d_1$ is the first distance, and $\gamma_1$ is around $$\frac{1}{\tan|\Theta_{B1}|},$$

where $\Theta_{B1}$ is a nanojet beam radiation angle generated by the first step structure and the third step structure, wherein $$\Theta_{B1} \approx \frac{90° - \Theta_{TIR_1} + \alpha}{2}$$

where $$\Theta_{TIR1} = \sin^{-1}\left(\frac{n_1}{n_2}\right)$$

is a first critical angle of refraction, $n_1$ is the first refractive index value of the host medium, $n_2$ is the second refractive index value of the first layer, wherein $$\left(\frac{d_2}{2}\right)$$

has a value around $H_2/\gamma_2$, wherein $d_2$ is the second distance, $\gamma_2$ is around $$\frac{1}{\tan|\Theta_{B2}|},$$

where $\Theta_{B2}$ is a nanojet beam radiation angle generated by the second step structure and the fourth step structure, and wherein $$\Theta_{B2} \approx \frac{90° - \Theta_{TIR2} + \alpha}{2}$$

where $$\Theta_{TIR2} = \sin^{-1}\left(\frac{n_1}{n_3}\right)$$

is a second critical angle of refraction, and $n_3$ is the third refractive index value of the second layer.

7. The device of claim 5,
wherein the first step structure further comprises a first top surface and the second step structure further comprises a second top surface;
wherein the first bottom surface of the first step structure and the first top surface of the first step structure are parallel to a first plane, and the first edge of the first step structure is non-perpendicular to the first top surface and the first bottom surface; and
wherein the second bottom surface of the second step structure and the second top surface of the second step structure are parallel to the first plane, and the second edge of the second step structure is non-perpendicular to the second top surface and the second bottom surface.

8. The device of claim 1, wherein:
the device is configured such that the incident electromagnetic wave is a plane wave that hits the device at an angle of incidence $\Theta_i$, and
the first step structure includes a first edge, a first bottom surface, and a first base angle between the first edge and the first bottom surface,
the second step structure includes a second edge, a second bottom surface, and a second base angle between the second edge and the second bottom surface, and
the first base angle and the second base angle are equal to 90 degrees.

9. The device of claim 8, wherein the second refractive index value of the first layer is equal to the third refractive index value of the second layer, wherein the first step structure and the third step structure have a same first height $H_1$, and wherein the second distance $d_2$ is described according to $$\left(\frac{d_2}{2}\right) = -\left(\frac{d_1}{2}\right) - H_1 \cdot \frac{\tan\Theta'_{B1} + \tan\Theta''_{B1}}{2},$$

wherein $$\Theta'_{B1} \approx \frac{90° - \Theta_{TIR}}{2} + \frac{\Theta_i}{2}, \text{ and}$$

$$\Theta''_{B1} \approx \frac{90° - \Theta_{TIR}}{2} - \frac{\Theta_i}{2},$$

where $d_1$ is the first distance, and $$\Theta_{TIR} = \sin^{-1}\left(\frac{n_1}{n_2}\right)$$

is a critical angle of refraction, $n_1$ is the first refractive index value of the host medium, and $n_2$ is the second refractive index value of the first layer.

10. The device of claim 1, wherein the third refractive index value of the second layer is smaller than the second refractive index value of the first layer.

11. The device of claim 1, wherein the incident electromagnetic wave has a wavelength equal to a value between 390 and 700 nm.

12. The device of claim 1, wherein the second layer has a shape that is selected from the group consisting of a cuboid shape, a cylinder shape, and a prism shape.

13. The device of claim 1, wherein the host medium comprises a homogenous dielectric host medium.

14. The device of claim 1, wherein the host medium functions as an embedding layer in which at least the second layer comprising the second step structure is embedded.

15. The device of claim 1, wherein the first step structure has a first height, wherein the second step structure has a second height, and wherein the second height is based on the first height, the first refractive index value, and the second refractive index value.

16. The device of claim 1, wherein the first step structure and the third step structure have a first height, wherein the second step structure and the fourth step structure have a second height, and wherein the second height is based on the first height, the first refractive index value, and the second refractive index value.

17. The device of claim 1, wherein the device receives the incident electromagnetic wave as a plane wave normal to the first layer.

18. The device of claim 1, wherein the focal spot is beyond the second layer.

19. The device of claim 1, wherein the first step structure and the third step structure have a same first height, wherein the second step structure and the fourth step structure have a same second height;
wherein the second height is based on the first height, the first distance, and a nanojet beam radiation angle generated by the first step structure and the third step structure; and
wherein the second distance is based on the second height and a nanojet beam radiation angle generated by the second step structure and the fourth step structure.

* * * * *